United States Patent [19]
Curtis, deceased

[11] 3,913,398
[45] Oct. 21, 1975

[54] APPARATUS AND METHOD FOR DETERMINING FLUID FLOW RATES FROM TEMPERATURE LOG DATA

[75] Inventor: M. Rex Curtis, deceased, late of Ridgefield, Conn.

[73] Assignee: Schlumberger Technology Corporation, New York, N.Y.

[22] Filed: Oct. 9, 1973

[21] Appl. No.: 404,839

[52] U.S. Cl. ................................................. 73/154
[51] Int. Cl.² ........................................ E21B 47/06
[58] Field of Search .............................. 73/154, 152

[56] References Cited
UNITED STATES PATENTS
2,739,475   3/1956   Nowak ........................... 73/154 UX

*Primary Examiner*—Jerry W. Myracle
*Attorney, Agent, or Firm*—William R. Sherman; Edward M. Roney; Bruce N. Carpenter

[57] ABSTRACT

An illustrative embodiment of the present invention includes methods and apparatus for producing measurements in a fluid flowing in a subsurface well or pipe which are representative of temperature changes attributed to heat transfer between the flowing fluid and heat conductive media surrounding the flow path. Measured temperatures are compared with temperatures computed from a model for heat transfer representative of the conditions known to be present but which also must incorporate estimates of at least one unknown parameter. The model is progressively adjusted using a series of estimates for at least one unknown parameter until a satisfactory comparison is obtained between measured and computed temperatures. From the resulting final estimate, mass flow rates and, in some cases, volumetric flow rates are then computed. Optional output includes measured temperatures along with temperatures computed using the adjusted model for heat transfer and the final estimate.

The method is particularly applicable to determining flow rates of fluids produced in oil wells at each of several possible entry points, especially where these entry points are spaced so closely that a constant rate of heat transfer is not reached between these points. This latter condition is indicated when the temperature of the flowing fluid does not reach an asymptotic value.

41 Claims, 9 Drawing Figures

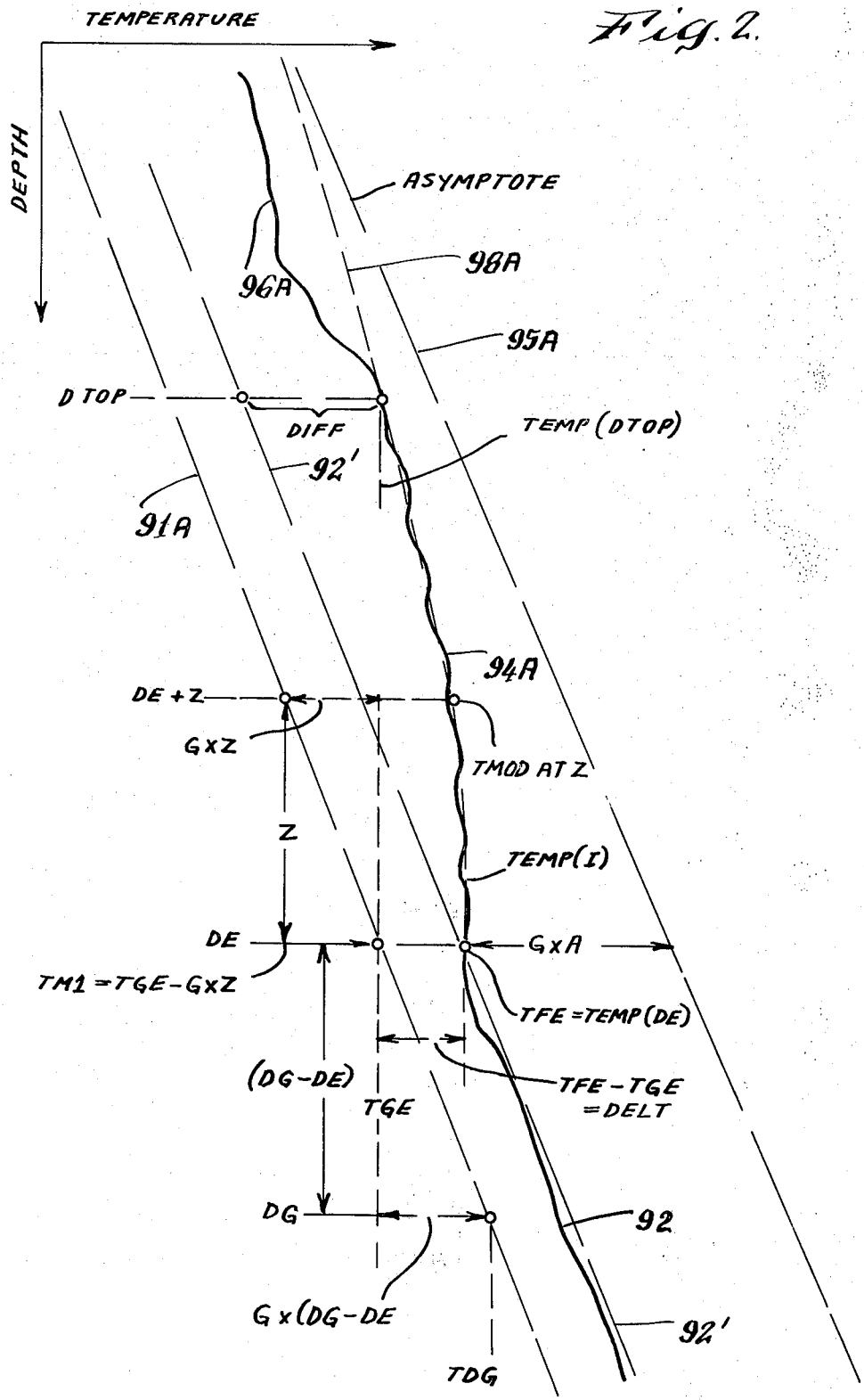

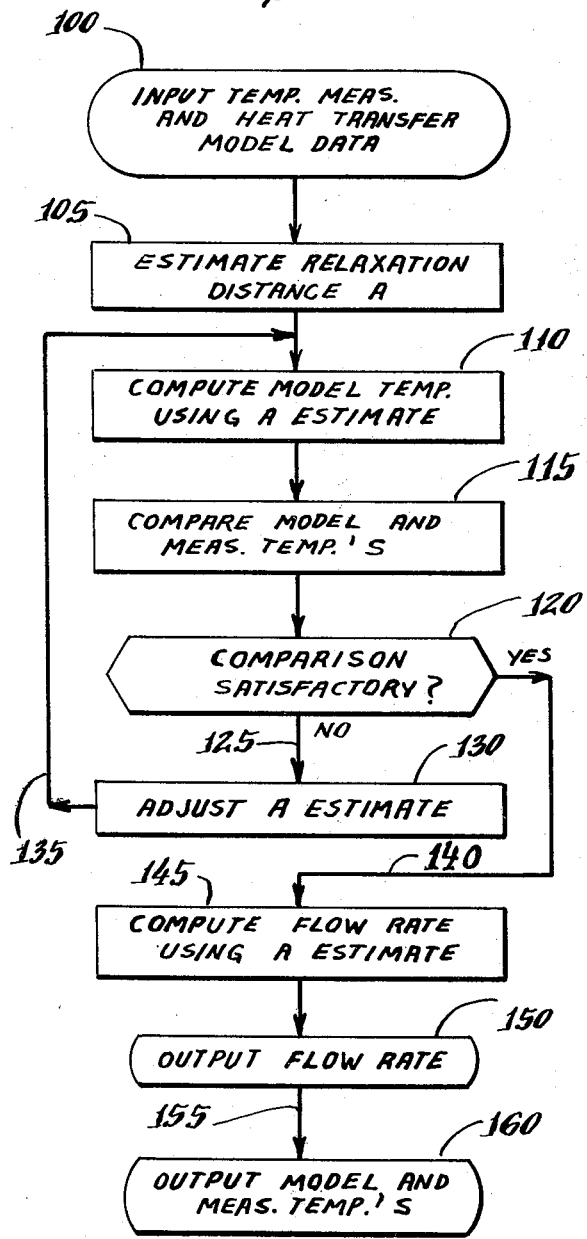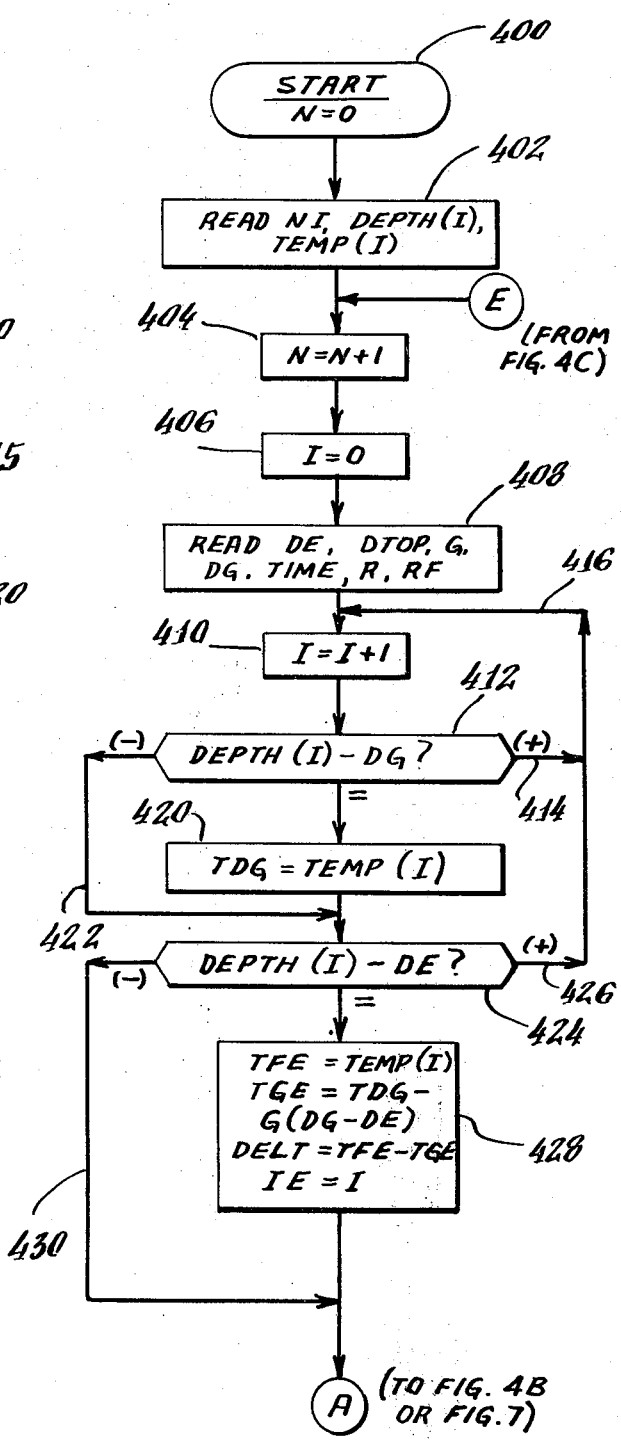

APPARATUS AND METHOD FOR DETERMINING FLUID FLOW RATES FROM TEMPERATURE LOG DATA

The present invention relates to the use of subsurface measures to determine certain subsurface conditions and, more particularly, to well logging apparatus and methods for processing temperature well log data.

Apparatus for measuring temperatures in a pipe or borehole and recording these temperatures versus time or distance are well developed in the prior art. One such temperature logging apparatus is described in U.S. Pat. No. 3,683,688 issued Aug. 15, 1972 to Lewis A. Allaud and entitled, "Method and Apparatus for Thermometric Well Logging". This patent describes an apparatus for measuring the temperature of a fluid in a borehole versus depth and subtracting a geothermal gradient from such measurements to produce signals representative of only the thermal anomalies in the borehole. It is well established that such thermal anomalies are useful to detect either points of fluid entry into subsurface formations or points of fluid production from such formations.

Temperature Logs have been found to be particularly useful in studies of the secondary recovery of crude petroleum. Fluids of known volumes and temperatures are injected from the surface through a borehole into permeable underground formations. The injected fluids move, along with the desired petroleum, through such permeable formations toward nearby production wells. It is important to be able to not only locate each permeable formation accepting fluid but also to determine the flow rates at which the fluid enters each formation. To this end, several techniques have been developed for processing temperature measurements obtained in injection wells to determine volumetric flow rates.

A patent illustrating the use of temperature measurements made in injection borehole is U.S. Pat. No. 2,739,475 issued to T. J. Nowak on March 27, 1956 and entitled, "Determination of Borehole Injection Profiles." This process involves running one temperature log during the steady-state injection of the fluid and one or more additional along with after the injection well is shut in. During shut in, it is assumed that no fluid is allowed to flow during the time of measurement or between the measurement runs. The comparison of the temperature measurements made under injection and shut in conditions permit a determination of volumetric flow rates of the fluids into various permeable underground strata.

During the shut in period the temperature of the fluid within the borehole changes from its injection temperature toward the equilibrium or geothermal temperature of the formations surrounding the borehole. This temperature change occurs more slowly at points opposite permeable formations which have received injection fluids than at points opposite formations which have not received injection fluids. This is due to the fact that the radial outward flow of the injected fluids from the borehole into the receiving formations has changed the temperature of these formations to a temperature more closely approximating that of the injected fluid. This formation temperature change may extend for relatively great distances from the borehole.

In contrast, relatively little temperature change occurs in formations not receiving fluids. The rate by which the temperature of the borehole fluid changes under shut in conditions depends, of course, upon the temperature difference between this fluid and the formation at the borehole wall at the time the injection well was shut in. Formations which have had their temperature changed over greater radial distances by receiving larger amounts of fluids will recover more slowly.

By measuring the rate of change with time of borehole fluid temperatures opposite each formation which has received fluid and comparing the relative rates measured for each such formation as compared to a known amount of fluid injected, the relative amounts of fluid injected into formation may be obtained. However, in order to obtain the required shut in measurements, it is necessary to shut in the well for periods as long as 40 days.

Any technique which requires either an injection or production well to be deactivated by the necessity to obtain shut in measurements is at an expensive disadvantage to a technique which can obtain the required measurements without disrupting the primary purpose of the well.

Accordingly, it is an object of the present invention to provide a technique for determining flow rates without the necessity of shutting off the normal flow of fluids for long periods of time.

A more recent refinement to the process of measuring temperatures to determine the injectivity profile of a reservoir interval is described in U.S. Pat. No. 3,709,032 issued to Roy D. Coles, Jr. et al. on Jan. 9, 1973 entitled, "Temperature Pulsed Injectivity Profiling". The temperature of the receiving formations are pulsed by injecting a fluid of known amount and distinctive temperature for only a short time. The well is shut in and measurements made of the rate of temperature recovery within the well opposite such formations. These measurements are conducted over a relatively short period of shut in time. From the shut in temperature measurements opposite each formation, a determination of a corresponding flow rate of injection fluid into such formations is made. The method has the advantage that the injection well need be deactivated only for a short period of time to make such measurements, perhaps only for a period of less than 24 hours.

While most of the more sophisticated temperature log processing techniques have been developed for the study of injection profiles, temperature logs have been applied in determining volumetric rates of fluids produced into a borehole from a producing formation. Large anomalies are frequently observed in gas producing wells where the temperature measurements are made during the actual production of the gas. Gas escaping from a high-pressure producing formation into an empty hole undergoes considerable cooling. The amount of cooling is determined by several factors, one of which includes the amount of gas produced. One method of determining flow rates for such gas production is described in a paper entitled, "Temperature Surveys and Gas Producing Wells" published in the *Journal of Petroleum Technology* on July, 1955 by K. S. Kunz et al.

Theoretical considerations for heat exchange between the gas produced and the borehole along which the produced gas flows, predicts that the cooled gas will begin gaining heat from formations surrounding the borehole along its upward flow path. The heating of the produced gas has a corresponding cooling effect upon the surrounding formations. Since the formation temperatures decrease with decreasing depth according to their geothermal temperature profile, usually at some point along the upward flow path, the temperature of the gas equals that of the geothermal temperature and no heat exchange takes place at this point. Without heat exchange, there is no temperature change, thus indicating the point where there is a temperature equilibrium between the fluid and formation.

Above the temperature equilibrium point, the formation temperatures continue to decrease with decreasing depth. As the gas continues upward, heat now flows from the warner gas into the cooler formations. With decreasing depth the difference in temperature between the formations and the gas continues to increase along with the resulting heat flow. At some point along the flow path this difference in temperature and the corresponding heat flow stablilize so that one exactly offsets the other. Above this point the heat flow will be in equilibrium and the gas and formation temperatures will decrease at the same rate.

In other words, heat transferring from a gas into the surrounding formations along the flow path cools the gas at the same rate that the formations are cooling along the path. The fluid and formation are then in a heat transfer equilibrium condition. The rate of formation cooling is predicted by their geothermal profile. Thus the temperature profile of the upward flowing gas will also approach a profile which is parallel to the geothermal profile. The difference in temperature between these two profiles is known to be related to the mass flow rate of the gas. The mass flow rate represents the ability of a fluid to transport heat along its flow path. Thus a substantial effort has been directed to determining this temperature difference $\Delta T$.

Where long flow paths or substantially low flow rates permit, the temperature profile in the gas may be defined by numerous measurements taken over a long measurement interval. In order to establish the difference in temperature gradients, it is further required that the formation temperature $T_{form}$ be known and predictable from a constant geothermal gradient G over such a depth interval; that is $$T_{form} = G \times \text{DEPTH} \qquad (1).$$

In temperature logging art the terms geothermal gradient and temperature gradient have been used to designate a temperature profile with depth which has a substantially constant temperature gradient. This definition will be used herein.

The temperature difference $\Delta T$ can then be easily determined if an equilibrium heat transfer condition is obtained as indicated by the temperature gradient becoming constant and parallel to the geothermal gradient. The mass flow rate $Q_M$ has been related to $\Delta T$ both for the case of gas and oil production by the simple relation, $$Q_M = C \times \Delta T \qquad (2)$$

where $C$ is a coefficient that depends upon the heat related properties of the flowing fluid, the borehole and formations surrounding the borehole. More recently, it has been recognized that this coefficient also depends upon the length of time the heat transfer has taken place. The value of $C$ becomes more predictable with longer heat transfer times.

The determination of $\Delta T$ for use in Equation (2) is more difficult when heat transfer equilibrium between the flowing fluid and the formation has not been reached. Theoretical considerations predict that the temperature of a flowing fluid asymptotically approaches a temperature gradient equal to, but displaced $\Delta T$ degrees from the geothermal gradient. Thus the flowing fluid temperature gradient has been known as an asymptote. Unfortunately, the position of the asymptote can be measured directly by temperature measurements only under rather ideal circumstances requiring long uninterrupted flow paths with uniform geothermal gradients and heat transfer properties.

Flow paths are often interrupted by additional fluid entries. Geothermal gradients are usually constant only over short intervals of relatively uniform formations. The heat transfer properties along the flow path frequently vary with hole size, casing and cementing conditions.

It is therefore an object of the present invention to provide a technique for determining mass flow rates where the asymptotic temperature gradient of the flowing fluid can not be measured directly.

In gas production where the gas flow is first cooler, then equal to and then finally warmer than the formation temperatures along its upward flow path and where the point where no heat transfer takes place can also be determined, an attempt to predict $\Delta T$ can be made. Such attempts use various graphical projections of tangents at selected points on a curve reflecting continuous temperature measurements recorded with depth. The points are selected between the entry point and the point corresponding to no heat transfer. This latter point corresponds to the point where the temperature curve is parallel to the depth axis of the recording or log and is sometimes referred to as the point where the curve becomes vertical.

A paper entitled, "Quantitative Evaluation of Temperature Logs In Gas Flowing Gas Wells" presented at the Second Annual Meeting of the Society of Professional Well Log Analysts on May 18, 1961 by J. Eric Schonblom describes a graphical technique using both one and two point methods to predict "$\Delta$" which is related to $\Delta t$. Unfortunately the techniques are limited to the case of fluid entering the flow path at temperatures cooler than the surrounding formations (gas expanding from low permeable formations). The cool gas subsequently warms up to the formation temperature to establish the required no heat transfer point. Thus this projection technique is not appropriate for determining flow rates where the temperature of the produced fluid is the same as the formation temperature, which is commonly the case in oil production.

Accordingly, it is an object of the present invention to provide a technique for determining flow rates for fluids entering the flow path which is not limited by the entry temperatures of such fluids.

As is obvious when employing techniques using graphical projections of a recorded curve, a visible recording of sufficient resolution is required. Often such a recording may not be immediately available, if available at all.

Accordingly, it is an object of the present invention to provide a technique for determining flow rates which does not require a visible recording of the temperature measurements.

When selecting the one or two required points upon which to base the graphical projections used in graphical techniques, care must be taken to avoid "bumps and wiggles" in the recorded curve. This limitation was recognized by the above Schonblom paper. Often no such satisfactorily smooth point on the recording may exist. In such a case the user is forced either to abandon this technique or make a somewhat arbitrary choice as to the point and attitude of such graphical projections.

Accordingly, it is a further object of the present invention to provide a technique of determining flow rates which is substantially immune to local variations in the temperature measurements.

In addition to the above prior art methods which attempt to use one or two selected points on a temperature curve to represent an entire curve segment, a plotting method employing more than two points has been described for use on temperature measurements obtained for various times in shut in wells. This method is described in a paper entitled, "The Estimation of Water Injection Profiles from Temperature Surveys" published in *Petroleum Transactions*, AIME in Volume 198 in 1953 by T. J. Nowak.

The above method assumes a simplified heat transfer model in which the temperature in a shut-in injection well "recovers" in a manner similar to the recovery of pressure in a shut in production well (see Pages 204 and 205). Accordingly, the temperature changes taken at a given depth from separate temperature logs in a shut in well are plotted against a logarithmic function of differences in time. If a straight line results, K, the thermal conductivity of the formation can be determined. If a non-linear relationship results, as shown by a curved line, the temperature data indicates some flow still exists. Thus the method is dependent upon a linear relationship between functions of temperatures and times as characterized by measurements made under static or shut in conditions.

Accordingly, it is an object of the present invention to provide a technique for determining flow rates which is not limited to a heat transfer model requiring a linear relationship between functions of temperature changes with time or depth.

Recent applications of computers to model physical systems representative of wellbore temperatures in shut-in wells have increased the understanding of factors affecting temperature measurements in water injection wells. Given specific conditions, the computer is used to solve assumed model relationships and to compute an expected temperature. Plots of the expected temperatures for various assumed model conditions have been helpful in understanding the nature of variations often found in temperature measurements made at various times in shut-in injection wells.

One such study is presented in a paper, "Computer Study of Factors Affecting Profiles in Water Injection Wells" published in November, 1970 in the *Journal of Petroleum Technology* by Robert C. Smith at al. An important conclusion of this study is that differential temperature curves are not applicable to quantitative determination of water injection profiles. Shut in absolute temperature profiles were found to be significantly affected by numerous factors which had been previously neglected.

Accordingly, an object of the present invention is to provide a technique for determining flow rates which includes a model for heat transfer not limited by the necessity to simplify the model by neglecting significant factors in order to apply the model in quantitative analysis.

In accordance with the objects of the present invention, a technique of automatically determining flow characteristics of fluids entering subsurface wells is provided. Measurements representative of the temperature of a fluid flowing in a subsurface flow path surrounded by a subsurface heat conductive media are produced in a computer input compatible form. A model for heat transfer between the subsurface heat conductive media and the flowing fluid is adjusted to fit at least a portion of the measurements. Using the resulting adjusted model, flow characteristics of the fluid are then determined.

The model may be adjusted to a portion of the measurements where the flowing fluid is at a temperature different than the subsurface heat conductive media. This temperature difference induces a radial heat transfer between the media and the fluid. Once the model for heat transfer is matched to the measurements, the mass flow rate of the fluid may be determined. When the density of the fluid is known, the volumetric flow rate may be also determined.

The technique is particularly applicable when the fluid enters at several points which are spaced so closely along the flow path that the rate of heat transfer or temperature difference between the flowing fluid and the surrounding media does not reach an equilibrium condition.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 2 illustrates a portion of a temperature measurement characteristic of multiple entry points and the corresponding terminology used in the heat transfer model.

FIG. 3 illustrates the steps in the process of adjusting a model for heat transfer to satisfactorily compare with measured temperatures and using the adjusted model in computing flow rates.

FIGS. 4A through 4D are processing flow diagrams illustrative of the steps used in controlling a computer to perform one implementation of the techniques of the present invention.

Figure 1:
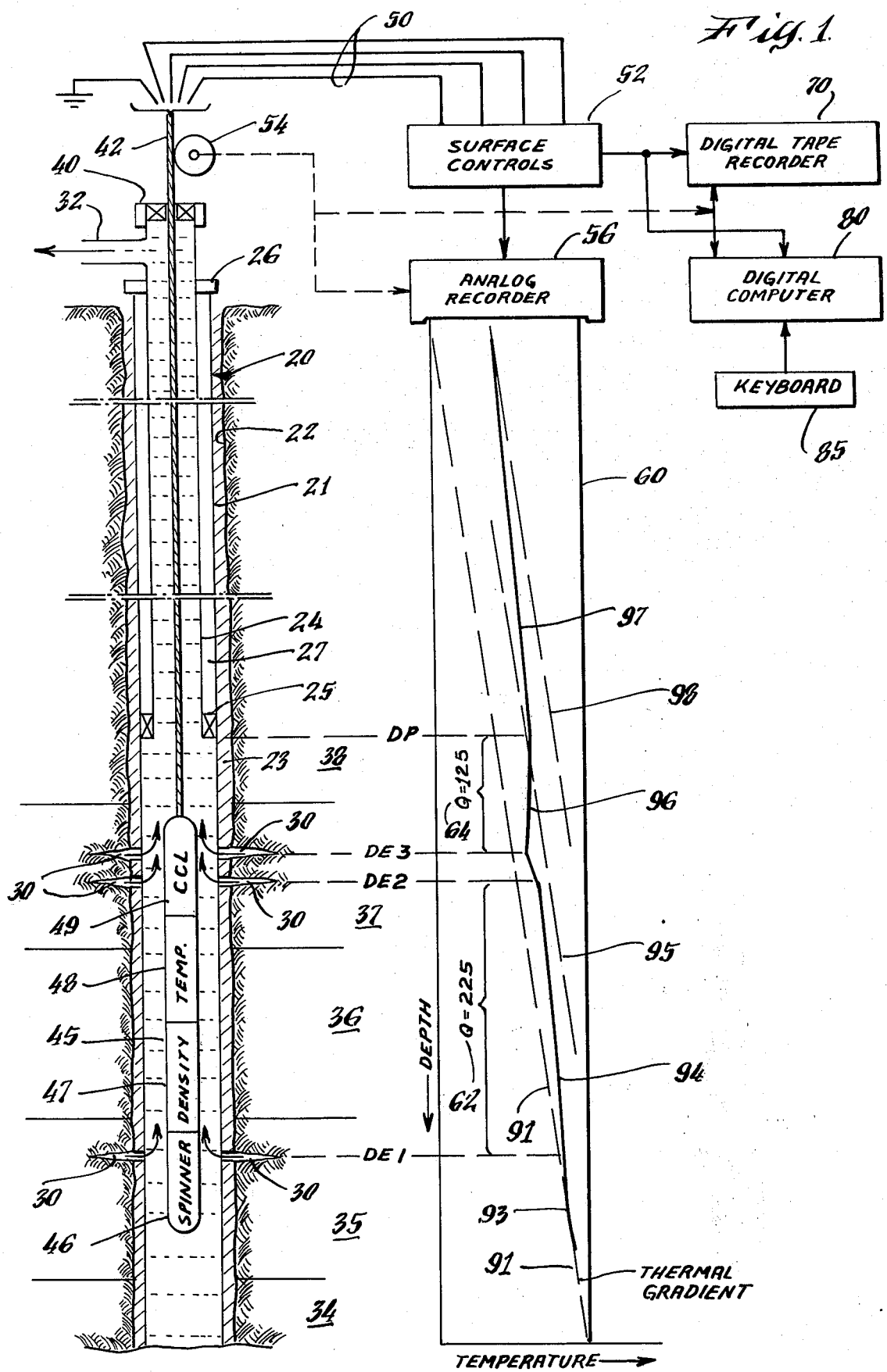
FIG. 1 illustrates the present invention as applied to fluids produced from subsurface formations at multiple entry points and flowing in the borehole during the temperature measurements.

As previously mentioned, much of the prior art effort has been directed toward the use of temperature measurements in shut in injection wells. A recent review of this effort is presented in a paper entitled, "Temperature Logging In Injection Wells" by E. J. Witterholt et al. and presented at the October, 1972 annual fall meeting of the Society of Petroleum Engineers of AIME.

A model for computing the fluid temperature $T_f$ as a function of depth z and the injection time $t$ may be presented as an equation:

$$T_f(z,t) = T_{Gs} + G_z - GA + (T_{fi} + GA - T_{Gs})e^{-z/A} \quad (3)$$

where $$A = \frac{q\rho_f C_f [k_h + r_{ci}Uf(t)]}{2\pi r_{ci}Uk_h} \quad (4)$$

Here
$G$ = the geothermal gradient,
$T_{Gs}$ = geothermal temperature at the surface,
$T_{fi}$ = initial fluid temperate at the surface,
$q$ = injection rate,
$\pi_f$ = density of injection fluid,
$C_f$ = specific heat of injection fluid,
$k_h$ = thermal conductivity of surrounding formations,
$r_{ci}$ = inner radius of casing,
$U$ = overall heat transfer coefficient of borehole fluid-casing system, and
$f(t)$ = a function which accounts for time variation of heat transfer to the earth.

Under certain circumstances, for example, for large flow rates or long periods of time, these equations may be further simplified. In one simplification the equation (4) may be simplified to:

$$A = \frac{q\rho_f C_f}{2\pi k_h}f(t) \quad (5)$$

Further, the function $f(t)$ may be approximated by the equation for the temperature in an infinite radial system due to a line source of heat at the axis of the system. The approximation is:

$$f(t) = ln(r_{ce}/2\sqrt{Dt}) - 0.290 \quad (6)$$

where $r_{ce}$ is the outer radius of the casing in the borehole fluid-casing system and D is the formation diffusivity.

Equations 3 and 4 when simplified with the use of Equations 5 and 6 have been employed to estimate the conditions under which a useful temperature log may be expected to develop. For example, it is important to know how many days at a given injection rate are required in order to expect development of meaningful temperature anomalies in injection wells. For example, in order to predict the time at which the borehole temperature will approach its asymptotic behavior, parallel to the geothermal gradient, it is necessary for the value of the $e^{-z/A}$ term in equation 3 to approach zero. This occurs when z is several times the value of A. Since A is related to the injection rate $q$ and time $t$ through Equations 5 and 6, the optimum shut in times at which to run temperature logs may be predicted from past injection histories.

However, since the production of fluids may not significantly change the producing formation temperature as is the case where injection of fluids change the receiving formation temperature, shut in temperature measurements are not generally used in producing wells. Consequently, computer studies of injection well shut in temperature behavior are not always relevant to producing wells. In fact, temperature measurements in producing wells are generally made during producing rather than shut in conditions for the above and further reasons which will be discussed.

Referring now to FIG. 1, there is shown apparatus for producing temperature measurements in a borehole filled with fluid flowing from multiple entry points. In addition, apparatus is shown for digitally recording the temperature measurements and processing them according to the techniques of the present invention along with apparatus for providing graphical output of both the measured and computed results.

While the illustrated embodiment of FIG. 1 shows the invention as it may be performed for determining flow characteristics of fluids produced into a borehole from subsurface formations, the method may be applied equally as well to fluids flowing in other subsurface paths such as a pipeline or sewer conduit. In such cases entry points may correspond to known or unknown additional subsurface points for fluid entry connecting to the path in which the measurements are made. Still further, while the techniques are illustrated using temperature measurements taken versus depth, as in the case where the temperature measuring device is moved along the flow path, it should also be understood that the techniques of the present invention may be applied to measurements taken over a period of time at at least one point in the flow path with a known relationship to at least one point of fluid entry.

FIG. 1 illustrates a borehole 20 in which a casing 21 has been placed within a substantial part thereof. In the annulus between the borehole wall 22 and the casing 21, a cementing material 23 has been placed. In some cases production tubing 24 may be placed inside the casing 21. Fluid flow in the borehole may thereby be restricted to flowing within the casing and production tubing 24, particularly when installed with packer 25. Tubing is generally hung in the casing by a hanger 26.

Fluid enters the casing usually through perforations 30 which penetrate both the casing 21 and cementing material 23. Produced fluids then flow up the hole through the casing and tubing to a production line 32. During the logging under flowing conditions a borehole instrument 45 connected to a cable 42 is lowered through the tubing into the casing and, in some cases, into uncased boreholes.

The instrument 45 is moved by a suitable winch, not shown which is connected to the cable 42. A suitable blowout preventor or stuffing box 40 may be installed at the surface end of a production tubing to allow cable movement while still controlling the flow of the fluid into the flow line.

Borehole instrument 45 may include more than one type of measurement apparatus. As shown in FIG. 1, a spinner-type velocity meter 46, a fluid density measuring device 47, a temperature measuring device 48 and a casing collar locator 49 may be combined into one instrument. Multiple signals may be communicated to the surface by means of multiconductor cable 42 or multiplexed on a single conductor cable and subsequently separated into separate signals at the surface controls 52. Electrical communication 50 between the moving cable and surface controls 52 may be provided by a suitable slip-ring collector which is not shown.

Depth measurements may be made by monitoring the cable motion with a suitable cable length measuring wheel 54 which may be mechanically or electrically connected to an analog recorder 56 for driving the graphical recording media 60.

Surface controls provide measurement signals to both the analog recorder 56 and any digital recording or processing equipment. This digital equipment may be in the form of a digital tape recorder 70 or in the form of a digital computer 80. The digital equipment may also be coordinated with depth by the measuring wheel 54.

In some cases the data may be recorded at the well site on the digital recorder 70 and communicated at some later time to the digital computer 80. After processing the measurements either using analog equipment or digital equipment, such as the digital computer 80, the original measurements along with any computed measurements may be also recorded by means of analog recorder 56 or other recorders commonly associated with such computers. Additional measurements such as casing size and thermal parameters needed to construct a model for heat transfer may be input to the computer by means of a keyboard 85.

In FIG. 1, the illustrated measurement (solid curve) corresponds to the temperature measurement. Casing collar, density and velocity curves are not illustrated.

Consider now only the temperature measurement, as derived from the temperature portion 48 of the instrument 45. When the instrument traverses the portion of the hole below the lowest possible point of entry for fluids, the measured temperature segment 93 corresponds to an approximation of the normal geothermal gradient, which is illustrated in FIG. 1 by a dashed line 91. In the case of most oil wells, this gradient represents a decrease in temperature of approximately 1° Farenheit for each 100 feet of decrease in depth.

The lowest point of fluid entry into the borehole is illustrated in FIG. 1 as DE1 and represents fluid produced from formation 35 through perforation 30. As the instrument passes DE1, the temperature measured in the borehole corresponds to the temperature of the fluid entering at this point. For fluids not being cooled by expansion of gas, which is the case of most oil production, the temperature measured at the lowest point corresponds to the formation temperature as reflected by the geothermal gradient at this depth.

As the fluid flows up the hole, the fluid cools at a rate slower than the rate by which the formations decrease in temperature. Thus in the portion of the temperature measurements indicated by segment 94, the fluid temperatures are shown to decrease slowly just above the entry point. As the fluid flows further upward, the rate of decrease in temperature increases along with the increasing difference in temperature between the fluid and formation.

As previously discussed, if only one entry point exists so that the measurements may be taken over an appreciable section of the flow path, the rate of decrease in temperature will approach, with distance from the entry point, the same rate of decrease found in the formations. This rate is predicted by the geothermal gradient. Thus temperature measurement profiles at some large distance from a single entry point may become parallel to the geothermal gradient but displaced by some temperature difference Δt from this gradient. As previously discussed, it is common for such measurements to be interrupted by other factors, such as additional fluid entry points, before a constant rate of temperature decrease is reached.

The effect of additional entry points is illustrated by the perforations 30 allowing additional production from formation 37 at depths indicated as DE2 and DE3 in FIG. 1. Since the cooler fluid entering at these points of entry mixes with the warmer fluid flowing upward from lower points of entry, the temperature of the fluid mixture in the borehole at this point will decrease toward the formation temperature, the amount of decrease representing the proportions of the mix.

Above the uppermost entry points the temperatures in the borehole fluid once again decrease but at first at a rate which is still slower than the formations surrounding the flow path. This difference in temperature between the borehole fluid and the formations continues to increase with flow up the borehole until a large enough temperature difference is accumulated to promote a transfer of heat at a rate which cools the borehole fluids at the same rate at which the formations cool, i.e. the geothermal gradient. This temperature difference is characteristic of the mass flow rate.

As shown by line segment 96, even the uppermost producing intervals may have their rate of approach toward their asymptotic temperature gradient interrupted by factors other than additional entry points. In this case, the interruption occurs at depth DP corresponding to the packer 25 anchoring the bottom of the production tubing. The thermal conductive properties of the casing-cement-foramtion radial heat transfer path below point DP may differ substantially when a tubing string 24 and annulus 27, as illustrated in FIG. 1 above the point DP, are also placed in this path. Thus the rate of approach of the borehole fluid temperature to its asymptote will differ according to the difference in the heat transfer capacities caused by the addition of the tubing 24 and tubing-to-casing annulus 27. Without proper consideration of this different radial heat transfer capability, different flow rates would be computed for temperature measurement segments 96 and 97, even though there is no actual change in the flow rates.

When the digital computer 80 is employed at the measurement site, flow rates may be automatically computed for each segment of the temperature measurements which correspond to successive entry points. For example, as illustrated in FIG. 1, the flow rate Q for segment 94 may be computed as indicated to be 225 barrels per day, while for segment 96 a flow rate of 125 barrels per day is obtained. The total flow rate combining these two flows is 400 barrels/day. It is interesting to note that if the flow rate were computed by the methods of the present invention using measurement segment 97, a flow rate of 400 barrels per day would also be obtained. This is because the model for heat transfer would include proper consideration for the additional tubing 24 and annulus 27.

The flow rates may be printed directly on the well site recording as shown at 62 and 64. In addition, the asymptotes obtained for each measurement segment by the techniques of the present invention may be plotted on the well site recording. These are illustrated by dashed lines 95 and 98 showing the asymptotic values for measurement segments 94 and 97 respectively.

FIG. 2 illustrates in more detail the nature of the temperature measurements expected in the vicinity of an entry point, here designated DE. As usually is the custom, temperatures are recorded as increasing to the right, while depth increases from top to bottom. The features in FIG. 2, which have corresponding features in FIG. 1, are indicated by common reference numbers but are here followed by the letter "A".

Referring now to the temperature measurements near the bottom of FIG. 2, where the measurements 92 are shown to be substantially displaced to the right of the geothermal gradient 91A. With decreasing depth the measurements more closely approximate an asymptote 92' which is parallel to the gradient 91A. The displacement between gradients illustrated by dashed lines 91A and 92' correspond to fluid entry well below DE and flowing upward toward DE. As additional fluid enters the borehole at and just below point DE and mixes with this flow from below, the temperature of the borehole fluid will change to correspond to the combination of the two flows.

As previously explained, the rate of cooling of the fluid increases with decreasing depth above the entry point but not as fast as the rate of decrease in temperature corresponding to the geothermal gradient. Thus an increasing difference in the temperature between the geothermal gradient or formation temperatures and the fluid flowing through these formations accumulates with increasing distance above DE. The more the accumulated difference in temperature, the greater the rate of heat transfer. With increasing distance along the flow path, the difference in temperatures increases until an equilibrium condition representative of a constant rate of heat transfer and a corresponding constant difference in temperature occurs.

However, as illustrated in FIG. 2, between segments 94A and 96A, this increase in heat transfer may be interrupted by other factors, such as occurs just above the point designated as DTOP, which affect the temperature of the flowing fluid. Thus only the portions of the temperature measurement between the points designated DE and DTOP are representative of the flow rate immediately above DE.

As illustrated in FIG. 2, the geothermal gradient indicated by dashed line 91A may be expressed as a rate of change of temperature with flow path distance. For example, the temperature difference between points designated as DG and DE may be computed from the gradient G multiplied by the difference in distance (DG - DE). Further, the temperature of the formations considered to be in equilibrium with the geothermal temperature may be computed by knowing the formation temperature TDG at a depth DG on the geothermal gradient. Thus, the formation temperature at DE may be computed knowing TDG, G and DG and is designated herein as TGE. For example, TGE = TDG−G(-BG−DE). The temperature of the fluid at point DE is designated TFE and may be measured directly as illustrated in FIG. 2 at the point opposite DE on the temperature measurement. The temperature measured at DE is designated TEMP(DE).

Further, the concept of the geothermal gradient may be used to predict the difference in formation temperature at any given point along the flow path relative to the temperature and distance from another point. For example, as illustrated in FIG. 2, the formation temperature at the point designated DE + Z located as interval Z above DE will be G×Z degrees less than at DE, because the difference in these formation temperatures is equal to the gradient G multiplied by the distance Z.

FIG. 2 also illustrates the asymptotic value 95A that would have been obtained had not the rate of the heat transfer changed above the point designated as DTOP.

In this case, these asymptotic temperature values must be computed as part of the technique of the present invention. They may also be recorded along with the original measurements, as illustrated. Temperatures corresponding to non-asymptotic conditions also may be computed from a model derived by the techniques of the present invention and displayed as indicated by the dashed line 98A. When computed temperatures are displayed along with the actual temperature measurements, visual comparison allows confirmation that the model as finally adjusted properly represents the portions of the actual measurements used to derive the model.

As indicated by the temperature measurements illustrated in FIG. 2 between points DE and DTOP, the actual measurements may vary from point to point while the computed temperatures based upon a properly adjusted model will correspond to a relatively smooth curve passing through the variations in the actual measurements. This illustrates an advantage of the techniques of the present invention in utilizing many points to determine a representative mass flow rate.

As previously explained, the simplified model, sometimes permissible for the case of shut-in wells where no flow takes place, can not be applied to the case of measurements taken during actual fluid flow. Similarly, conditions present in injection wells vary somewhat from conditions found in producing wells.

For example, unless cooling due to gas expansion or heating due to friction occurs, it can be assumed that the fluid entering the borehole at a given point has an entry temperature equivalent to the formation temperature from which it was produced. Further, under such conditions the production of a fluid will not change the formation temperature with time, as is the case where fluids of a temperature different than that of the formation are being injected into the formation over long periods of time.

Still further, the distance Z from the fluid entry point is referenced to the subsurface entry point in the case of production wells, while Z is referenced to the surface in the case of injection wells. Also the fluid flows upward in producing wells rather than downward as in injection wells. Thus produced fluids generally will lose heat to the formations surrounding their flow path. By contrast, in injection wells, unless the injection fluid is heated to temperatures substantially above the formation temperatures along the flow path, the injection fluid will be absorbing heat from the formation. In addition, the formation temperatures decrease the distance along the flow path for producing wells but increase for injection wells. Thus, equations derived for injection wells cannot be applied directly to producing wells.

An equation, approximate for predicting the temperature of a fluid Tf along a cylindrical flow path at a point located Z units from the entry point and at a time t from the beginning of the fluid production may be written as follows:

$$Tf(Z,t) = TGE - G \times Z + G \times A + (TFE - TGE - G \times A)e^{-Z/A} \quad (7)$$

where: $TGE$ is the temperature (°F) of the formation at a point at or above the fluid entry point;

$G$ is the average geothermal gradient (in degrees per foot);

$Z$ is the distance along the flow path increasing from the point of entry (in feet);

A is a parameter related to the density, specific heat and mass flow rate of the fluid flowing along the flow path; and TFE is the temperature (°F) of the flowing fluid at a point at or above the fluid entry point;

$e$ is the value of the natural logarithmic base (2.71828183).

For conditions common to producing wells, the parameter A, herein referred to as the relaxation distance, may be related to the mass flow rate $Q_M$ by the following simplified equation:

$$Q_M = \frac{A}{9.47 \times C_f f(t)} \quad (8)$$

where: $C_f$ is the specific heat of the fluid and, at least for water, may be assumed to be 1.0.

The above equation assumes that the thermal conductivity of the surrounding formations may be taken as equal to 33.6 Btu/day-ft-°F.

Examination of equation (7) shows that the relaxation distance A appears three times in the equation, twice in combination with the gradient G and once in the exponent $-Z/A$.

Referring again to FIG. 2, the significance of relaxation distance can be appreciated when it is realized that the product $G \times A$ represents the temperature difference between the asymptote 95A and the temperature TFE of the fluid at point DE. As was previously discussed, this difference cannot be directly measured unless the position of the asymptote 95A can be measured directly or determined from various prior art projection methods. Unfortunately, this is not possible under many actual measurement conditions. Therefore indirect methods of determining the relaxation distance must be taken.

In the preferred technique of the present invention an initial estimate for the relaxation distance is made. This estimate is combined with a model for heat transfer representative of the known measurement conditions. Model temperatures are then computed which correspond to at least a portion of the actual measurements. The computed model and measured temperatures are compared. Based upon the comparison, the estimated relaxation distance A is either adjusted to improve the comparison or, if the temperatures are found to satisfactorily compare, the value of A is used to derive the flow rate of the fluid inducing the heat transfer reflected in the temperature measurements.

Turning now to FIG. 3, there is illustrated a generalized procedure for obtaining the flow rates corresponding to a given segment or portion of the temperature measurements. This procedure may be implemented by a general purpose computer properly programmed to perform the illustrated steps of the process or by constructing a special purpose computer composed of circuits arranged to perform the equivalent steps. The details of these steps will be further described in regard to FIGS. 4A–4D and FIGS. 5 and 7.

Step 100 of FIG. 3 corresponds to the input of the temperature measurements either directly as recorded at the well or as subsequently read from a previous recording. For each temperature measurement a corresponding depth or time may also be input. The additional data describing the heat transfer model may also be input at this time, perhaps from the keyboard 85. Alternately, the model could be constructed for specific functions and heat transfer data. The model may be previously loaded into the computer or loaded at this time.

As previously described, since the heat transfer model in the case of flowing fluids is more complex than the simplified models sometimes allowed for shut in or static flow conditions, a direct solution of the heat transfer equations for flowing fluids may not be possible. Further, only a segment of the temperature measurements required for a direct solution may be available. It has been discovered that these problems can be overcome by adjusting a preliminary model for heat transfer by employing approximations of at least one parameter which is used to adjust the model for heat transfer until a satisfactory comparison is obtained between available temperature measurements and temperatures computed from the model. In addition, by discovering the nature of the comparison for erroneous approximations, the comparison may be used to improve the approximations. Still further, the approximated parameter is selected to be directly related to the fluid flow rate.

An initial procedure in the above process is illustrated by Step 105 in FIG. 3. As shown, an estimate is made of a parameter corresponding to the relaxation distance A previously defined. It is assumed that this estimate may be only a crude approximation of the final value. Specific methods of estimating A are illustrated and will be further described in regard to FIGS. 4B and 6.

For a given approximation of A, a temperature corresponding to the heat transfer model may be computed using equation (7). This process is represented by Step 110. Then, as shown in Step 115, the computed and measured temperatures are compared. The outcome of the comparison, as depicted by decision Step 120 determines the next step in the process.

In the usual case, the initial estimate of A will prove unsatisfactory, giving rise to a NO answer for the satisfactory comparison requirements depicted in Step 120. Thus the process continues, as indicated by Branch 125 and an adjustment to the previous estimate is made in order to improve the approximation, as illustrated in Step 130. The process returns to Step 110 and continues as previously described until a satisfactory comparison between the model and measured temperatures is obtained. When this is accomplished, the test indicated in Step 120 now answers YES and the process continues as illustrated by Branch 140 to Step 145.

At this point, the model has been adjusted until a single A value has been derived which is representative of the portion of temperature measurements considered in the previous steps. The flow rate corresponding to these measurements may now be computed using previously described equations, as indicated in Step 145.

The output of the resulting flow rate may be the next step in the process as illustrated by Step 150. An optional output may be the model temperatures computed as indicated in previous Step 110 using the final value of A along with the measured temperatures, if desired, as shown in Step 160. As illustrated in FIG. 2, such model data, when plotted along with the measured temperatures, allows confirmation that the model properly represents the measurements.

FIGS. 4A through 4D illustrate detailed steps representative of the techniques of the present invention. The techniques are illustrated as applied to automatically determining flow characteristics of fluid entering into subsurface wells and flowing past a point herein designated DE. In the illustrated case, the fluid is assumed to flow along a path indicated by decreasing values of depth. The individual depth samples are designated DEPTH(I). With decreasing DEPTH values, there is a corresponding decrease in the temperature of the heat conductive media along the flow path, as predicted by a geothermal gradient G. This gradient corresponds to the temperatures that would be measured along the flow path if no radial heat transfer occurred, as would be the case when no fluid was flowing during the measurements and had no flowed for a very long period of time prior to the measurements. Consequently at this time, the only heat transfer taking place, if any, is that heat transfer producing this static gradient. This heat transfer is considered to be parallel to the fluid flow path.

At some subsequent time, here designated TIME, after fluid had been entering the flow path at or below a given point DE measurements are taken along the flow path and include the interval between points DE and an additional point designated DTOP. DTOP normally corresponds to the top of the segment of the temperature measurements representing the relatively smooth approach of these measurements toward an asymptote which would be reached if no further change in the fluid flow rate or heat transfer capabilities occurred. A suitable measurement segment is illustrated in FIG. 2 and designated as 94A.

The process that will be described assumes temperature measurement data was sampled versus depth (for example, at 6-inch intervals) as would be the case for the production well illustrated in FIG. 1. It is further assumed that a number of intervals NI corresponding to temperature measurements above a number of entry points are to be processed. Throughout these intervals, the actual temperature measurement corresponding to each increment I of depth is designated TEMP(I) and the corresponding depth value is DEPTH(I). The temperature measurements may have been recorded on computer compatible magnetic tape, for example, and subsequently used as input to a computer or the measurements may have been placed directly as acquired into other storage facilities associated with the computer.

Further information which may be necessary to specify the model for heat transfer may be available from previously recorded measurements and input to the computer at the appropriate time. For example, temperature measurements recorded at a point DG which is below the deepest point of fluid entry and consequently represents the geothermal temperature at DG, may be used to establish at least one point on this gradient, as well as the gradient G in some cases.

In addition, output resulting from the illustrated techniques of the present invention may be output in numerical form on conventional devices such as a teletype or line printer. Further, graphical representations of the output may be obtained using conventional plotting techniques and apparatus.

Figure 6:
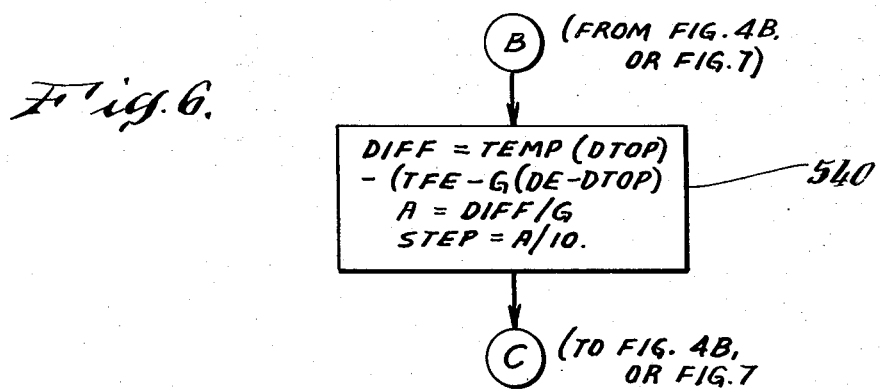
FIG. 6 illustrates an alternate method of determining the initial estimate of the relaxation distance.
Figure 7:
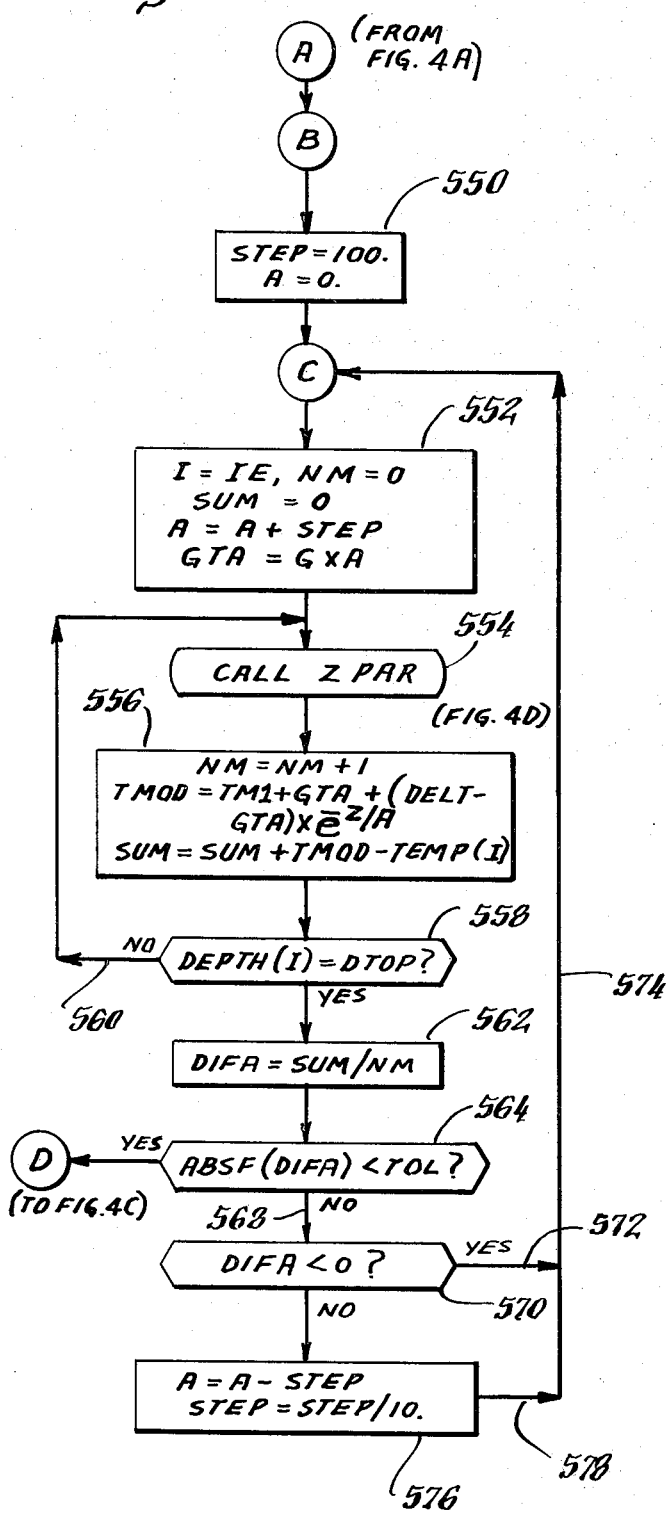
FIG. 7 illustrates the steps of an additional method of adjusting the heat exchange model to fit the measured temperatures.

While FIGS. 4A through 4D illustrate in detail steps in one possible implementation of the invention, FIGS. 6 and 7 illustrate alternate techniques which may be used in substitution for some of these steps. It will also be obvious that additional alternate methods may be developed by those of ordinary skill for some of the simpler steps illustrated in these detailed flow diagrams.

While special purpose computing apparatus may be constructed to perform the steps illustrated in the detailed flow diagrams, the preferred method of implementing the techniques of the present invention is through the use of a general purpose digital computer properly programmed to perform the illustrated steps. Depending upon economic and operational conditions, the general purpose computer may be of portable design so that the process may be performed at the well site or the computer may be of a large scale configuration and at a remote site, such as those found in fixed centralized installations.

A computer capable of performing the illustrated processess at the well site is designated as the PDP-11 and is made by Digital Equipment Corporation. Computers typical of larger scale fixed-site systems are the models 360/45 or 360/65 made by IBM. Peripheral devices appropriate for the associated input and output functions are of conventional design, such as usually associated with the above systems.

The steps shown in the process flow diagrams as disclosed herein are illustrative of the techniques of the present invention. Each of these steps may be directly translatable into a number of standard computer programming languages such as Fortran or PL/1 and used to generate instructions compatible with a specific computer. These instructions are loaded into the computer and used to automatically control the computer to perform the process illustrated in these diagrams. Thus these diagrams along with the accompanying description provide the necessary disclosure to enable one of ordinary skill to implement the invention using a general purpose digital computer.

Figure 4B:
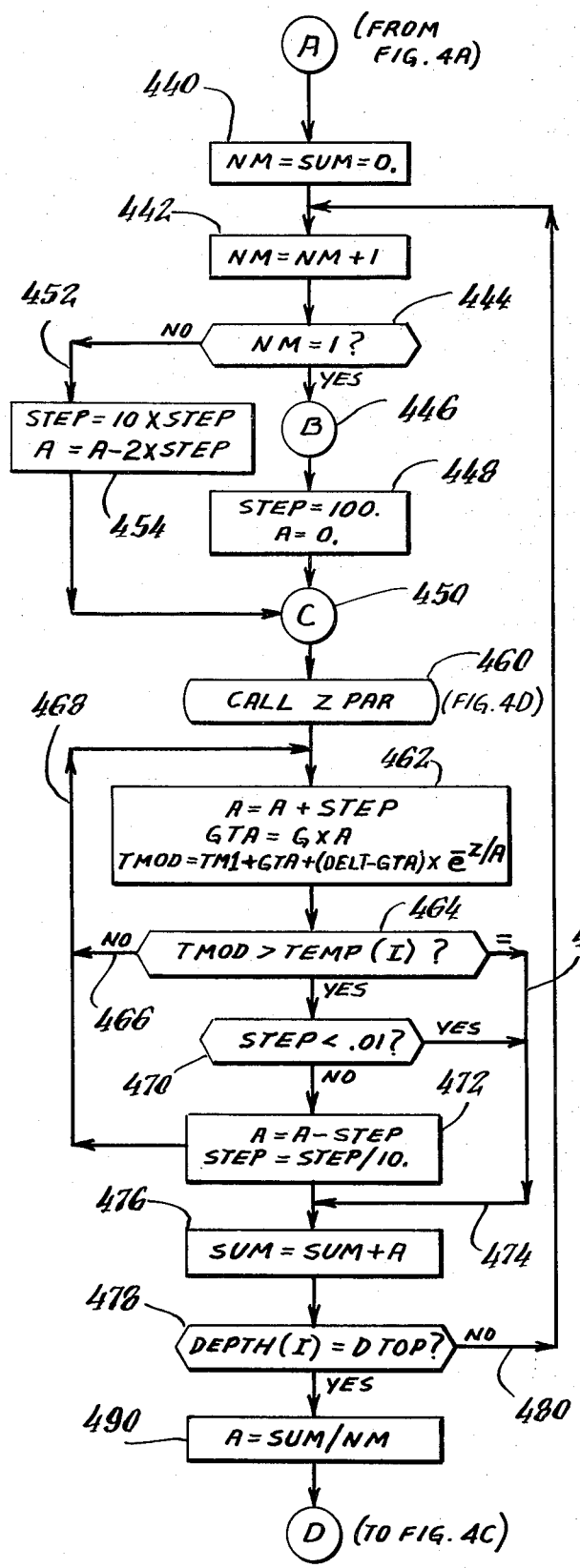
Figure 4C:
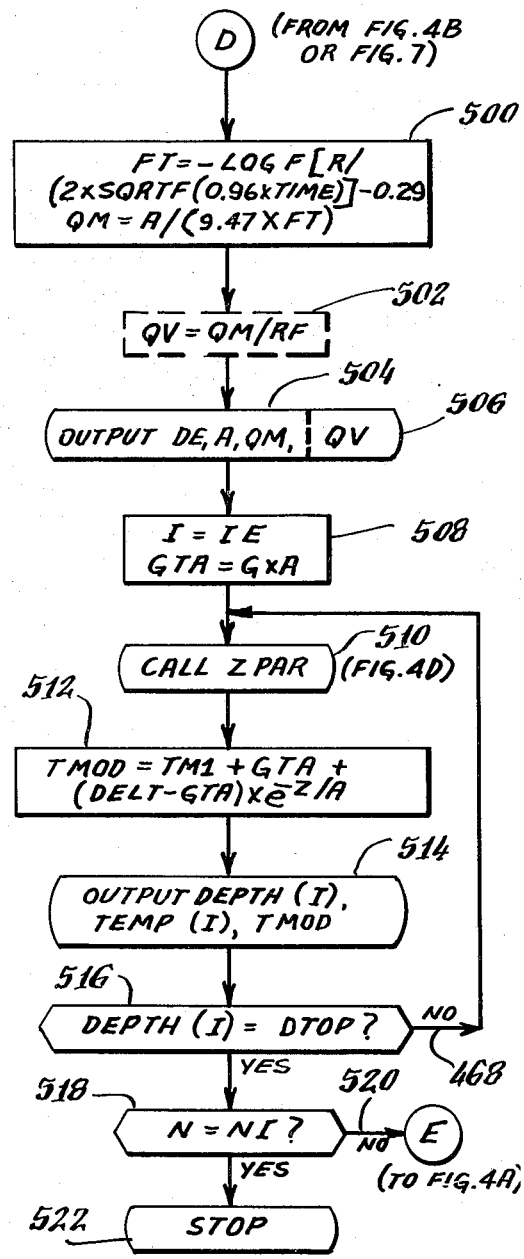
Figure 4D:
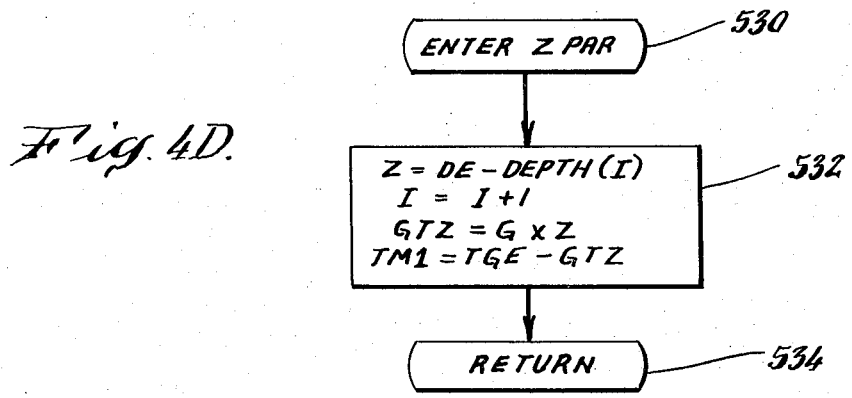

FIG. 4A illustrates some preliminary steps such as data input, interval definition and the establishment of certain constants for a given interval such as those representative of the geothermal gradient, fluid and borehole conditions. FIG. 4B illustrates the steps used in one method of adjusting a heat tranfer model by determining a single value of a relaxation distance A, which approximates the best value representative of the temperature measurements within a given interval. FIG. 7 illustrates the steps of another method to approximate the value of A. FIG. 4C illustrates the steps which may be used to compute the mass flow rate and the volumetric flow rate, if desired. These flow rates are now designated, respectively by the program symbols QM and QV. The corresponding model temperatures TMOD may also be computed from an adjusted model for heat transfer which results from the above procedures. FIG. 4D represents a subprocedure (Subroutine ZPAR) which is used at several points in the main procedure.

Referring now to FIG. 14A, Step 400 illustrates the start of a procedure to automatically process temperature measurement segments or intervals representative of several fluid entry points. At the start of this procedure an interval counter N is initialized to zero. As illustrated in the diagram the next step corresponds to Step 402 and represents the input of the number of intervals NI, the depth of the temperature measurement samples DEPTH(I) and the corresponding temperature measurements TEMP(I).

As previously described, this input may be from an earlier recorded digital tape or input directly into the computer, for example, if the process is being performed at the measurement site. Still further, the input may be by alternate devices such as a card reader which might be used in the case of inputting measurements available only in graphical form and were subsequently digitized.

The next step in the process is indicated as Step 404 and corresponds to incrementing the interval counter N to correspond to the current interval. Thereafter, as is indicated in Step 406, a sample counter I is set to its initial value. Subsequently, as indicated in Step 408, the parameters specific to a model for heat transfer corresponding to a given portion of the log measurements are input. This input may be also from magnetic tape, cards or a keyboard as shown in FIG. 1.

In the order shown in Step 408 of the FIG. 4A, these inputs are DE, a depth at or just above a fluid entry point; DTOP, which corresponds to the depth of the top of the temperature measurement interval to be processed; G, the geothermal gradient as previously described; DG, the depth reference point for the geothermal gradient; TIME, the time in days that the fluid has been flowing in the borehole; R, corresponding to the outer radius of the casing; and RF, the density of the fluid in the borehole between DE and DTOP.

As next shown in the Step 410 the sample counter I is incremented to correspond to the current sample and then as is shown in Step 412, the current depth sample DEPTH(I) is compared to DG. For the initial samples which may correspond, for example, to segment 92A of FIG. 2, the depth values may be deeper than the value of DG and the test indicated in Step 412 will give a positive (+) result. The process will consequently continue as indicated by Branches 414 and 416 to consider the next sample as previously described.

This initial process will continue until reaching a depth corresponding to DG, in which case DEPTH(I) will equal DG. The process then continues as indicated to Step 420 and the actual measured temperature TEMP(I) at this depth is stored as the geothermal (formation) temperature TDG corresponding to depth DG.

As indicated next in the Step 424, a further test is made to see if the depth of the sample also corresponds to depth DE. Since DE usually, as illustrated in FIG. 2, is above DG, this test will usually give a positive (+) result at this time and the process will continue as indicated by Branches 426 and 416 to return to the previously described Step 410.

The next sample will be tested as described in regard to Step 412 and now, since the depths are less than DG, the test shown in Step 412 will give a negative (−) result and the process now resumes as previously described for Step 424. This time it is distinctly possible that the depth value DEPTH(I) corresponds to DE. If this is the case, the test shown in Step 424 indicates this equality and the process continues to Step 428.

As indicated in Step 428, the temperature measurement TEMP(I) at point DE is stored as TFE and corresponds to the borehole fluid temperature at DE. The temperature TGE corresponding to the geothermal gradient at point DE, i.e., the assumed formation temperature, is computed as TGE = G(DG-DE).

It is further convenient to compute some values which are constant for a given interval so that they need not be wastefully recomputed for each subsequent sample within the interval. For example, as illustrated in Step 428, a constant DELT is computed equal to TFE-TGE. This constant corresponds to the first two terms in the brackets on the right-hand side of Equation (7). It is also convenient to store the sample number I and IE which corresponds to the point DE so that the depth and measured temperatures at this point may be easily referenced.

As illustrated in FIG. 4A, the process continues after Step 428 to Point A which is also illustrated both in FIG. 4B and FIG. 7. The process which follows Point A will be subsequently described in detail in regard to these figures.

Further in regard to FIG. 4A, if the test indicated in Step 424 gives a negative result, the process continues as indicated by Branch 430 directly to Point A. This result corresponds to depth values which are above DE. It is the temperature measurements between the points DE and DTOP which are to be further processed in accordance with the techniques described in regard to FIG. 4B and 7.

Referring now to FIG. 4B, and continuing at Point A previously described in regard to FIG. 4A, Step 440 corresponds to initializing the values for a counter NM used for counting the number of measurements included in the process which follows. Also initialized is an accumulator SUM used to accumulate values of approximations of the relaxation distance A corresponding to each of the levels which will be subsequently processed within the immediate interval.

The next step in the process illustrated in FIG. 4B is Step 442 and represents the incrementing of the measurement counter NM to correspond to the current measurement being processed.

As will be described later in more detail, the method illustrated in FIG. 4B for adjusting the model by approximating values of the relaxation distance A derives one approximation of A for each of the samples considered within a given interval. After completion of all of the considered samples, a single representative value of A corresponding to this interval is then derived.

In the process of approximating the value of A, an initial estimate may be made. More than one method of making this initial estimate is described herein. For example, the value of A found for the first sample considered within a given interval may be used to derive an initial estimate for the next considered sample. The initial estimate of the value for A for the first sample within a given interval (where NM = 1) may be obtained as illustrated in FIG. 4B by the combination of Steps 448 and 462 or by a procedure which may be substituted in place of Step 448 as illustrated in FIG. 6. This latter procedure will be described in more detail later.

Figure 5:
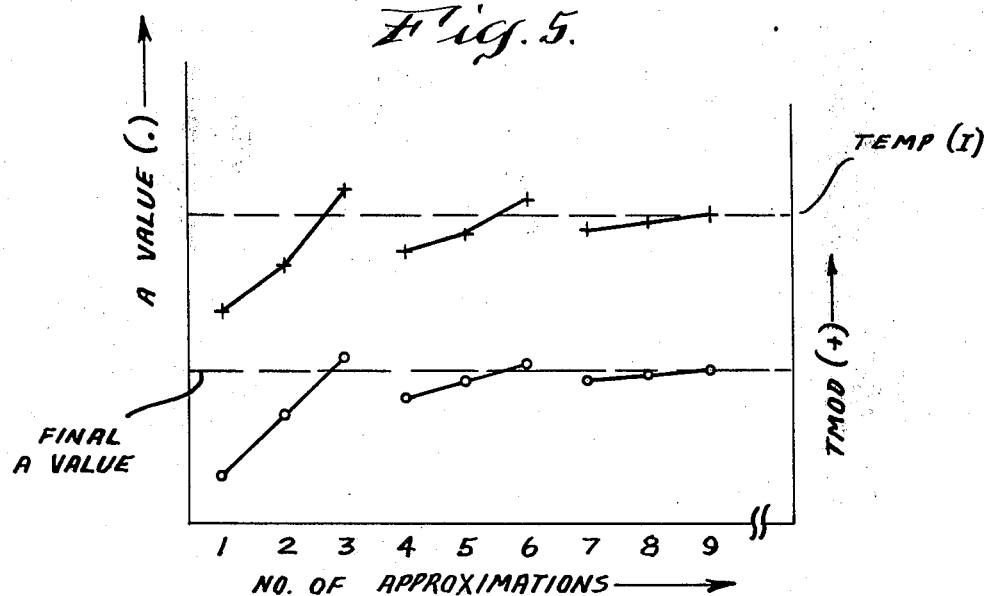
FIG. 5 illustrates one method of deriving successive approximations of the relaxation distance used in the heat transfer model.

For a better understanding of the method of adjusting the heat transfer model by approximating the relaxation distance A, refer now to FIG. 5 where there is shown a relationship between approximations of the value of A and the resulting temperature TMOD computed from the model using this value. This computed value is compared to the actual measured temperature for a given sample. The lefthand vertical axis corresponds to values of the relaxation distance A. The horizontal axis represents an increasing number of approximations of A for a given sample. The righthand vertical axis represents increasing temperatures both for the actual measured temperature TEMP(I) of a given sample as shown by the upper horizontal dashed line and for the temperature TMOD computed for a given approximation value of A.

Successive approximations of A are indicated by small circle while their corresponding TMOD values are indicated by cross symbols(+). The actual and hopefully final A value is also shown as represented by the lower horizontal dashed line.

Consider now the first approximation where the value of A is shown as leftmost circle corresponding to approximation No. 1. In the method of determining A illustrated in FIG. 4B, the initial estimate of the value of A corresponding to approximation No. 1 is made in a manner which insures that this value generally will be lower than the actual value. Subsequent approximations are determined by increasing the previous values by a given increment herein referred to as STEP. However, this increase is conditioned upon a comparison of the temperature TMOD computed from the model for heat transfer using the current approximation of A and actual measured temperature TEMP(I).

As shown in FIG. 5 for approximation No. 1 where A is less than the actual value, TMOD is substantially less than TEMP(I). Consequently, on the next approximation, the previous value for A is increased by STEP as shown for approximation No. 2. The resulting value of TMOD is also shown and still compares as substantially less than TEMP(I) so the value of A is again increased by the current value of STEP. However, as shown for approximation No. 3 the resulting TMOD value is now higher than TEMP(I) indicating that the value of A is also too high. Consequently, a lower value of A than that used on this approximation must be derived in order to continue this process of approximations.

One method of deriving such a lower value of A is to first decrease the value of A to a previous value known to be too low. This, for example, would correspond, in the above case, to the value used for approximation No. 2. This previous value may be determined by subtracting the current value of STEP from the current value of A. Further, since it is already known that this value of A is too small and that the value of STEP is too large, the value of STEP is decreased, for example, to one tenth its previous value, and then used to derive a new approximation for A.

As illustrated for approximation No. 4, the value of TMOD resulting from this new A value is less than the measured temperature. As previously described, the value of A is increased for the next approximation, however, this time by a lesser increment which corresponds to the new value of STEP. Again as shown for approximation No. 5, the value of TMOD is less than the measured temperature and the process continues to approximation No. 6. Here the computed temperature based upon the current value of A gives a value of TMOD which is higher than the measured temperature. Thus the current value of A must again be decreased, along with value of STEP to allow for an even slower incrementation of the value of A for subsequent approximations. In this manner, the values of A on subsequent approximations are continuously adjusted until a satisfactory comparison between the resulting computed temperature TMOD and the actual measured temperature TEMP(I) is obtained.

Now returning to FIG. 4B and considering the problem of deriving the first estimate of the value of A to be used for the first sample considered in a given interval, Step 444 of FIG. 4B corresponds to determining when the measurement number NM equals this initial sample. When the test indicated in Step 444 answers YES, the process continues to Point B as indicated at 446 to Step 448 shown in FIG. 4B.

One method of obtaining an initial estimate for the first sample corresponds, as shown in Step 448 to setting the initial value for STEP equal to a small percentage of the usual values encountered for A, for example 100, and initializing the value of A to zero. Then, as subsequently shown in Step 462, the initial value of A actually used in the computations becomes equal to the initial value for STEP. Another method for approximating the initial estimate of A will now be described in regard to FIG. 6.

Referring now to FIG. 6, there are shown the same Points B and C respectively indicated in FIG. 4B at 446 and 450. Thus, Step 540 of FIG. 6 may be substituted for Step 448 of FIG. 4B. The method of determining an initial estimate for the value of A illustrated in FIG. 6 differs from that illustrated in Step 448 of FIG. 4B in that the initial estimate is determined from the actual log measurements found within the interval being considered. For further understanding of the process corresponding to FIG. 6, refer once again to FIG. 2.

As shown in Point DE in FIG. 2, the difference in temperature between the asymptotes 92' and 95A is equal to G × A. Of course, in most cases the value of A is unknown along the position of the asymptote 95A. It is one of the objectives of the temperature log data processing described herein to determine the actual value of A. Since the asymptotes 92' and 95A are both parallel to the geothermal gradient 91A, the difference between asymptotes 92' and 95A is constant.

It can be readily seen in FIG. 2 that the difference designated DIFF corresponding to the difference in the measured temperature at DTOP, designated TEMP(DTOP) and the asymptote 92' approaches the difference G × A and would reach this value at some greater distance above DTOP if the rate of radial heat transfer had not been interrupted as illustrated at a point above DTOP. However, it is clear that the difference, DIFF equal to TEMP(DTOP)-(TFE-G × Z) where Z is equal to DE - DTOP, does approximate a minimum value for the difference G × A. Therefore the value of DIFF may be determined and subsequently divided by G to determine a first approximation of A. Also, it will be apparent that this approximation for A will be too small. Therefore, the illustrated method of increasing subsequent approximations for the value of A will be appropriate.

Referring once again to FIG. 6. Step 540 illustrates the computation of the difference in temperature DIFF illustrated in FIG. 2 at Point DTOP. This difference may be found by considering the measured temperature TEMP(DTOP) at DTOP and subtracting from it the temperature of the formation at the point DE, which is denoted as TFE herein and compensating for the change in temperature due to the geothermal gradient between DE and DTOP. This compensation is given by the term G(DE-DTOP) illustrated in Step 540.

Also illustrated is the deriving of the initial estimate for A by dividing this computed difference DIFF by the geothermal gradient G. The value used to increment successive approximations of A may be determined from this value of A. For example, the value may be a given percentage of A. As illustrated in Step 540 the value of STEP is set, for example, equal to one tenth of the value of the initial estimate of A. The process then continues at Point C as illustrated in FIG. 4B or FIG. 7 as indicated in FIG. 6.

Returning to this Point C, indicated at 450 in FIG. 4B, the next step in the processing of the initial sample within the temperature measurement interval is shown to correspond to Step 460. This step will be described in greater detail in regard to FIG. 4D. As for now, it suffices to say that this step corresponds to a subprocedure for determining the values of the parameters designated as Z and TM1 used as shown in the next Step, 462.

As shown in Step 462 of FIG. 4B, the actual value for the approximation A is determined by increasing the previous value of A by the increment STEP. It is convenient at this point to compute constants which are repeated in subsequent computations. For example, the constant G × A may be computed at this time and stored as GTA. Then the temperature corresponding to the model for radial heat transfer which includes the current value for the relaxation distance A is computed from Equation 7 which, as illustrated in Step 462 may be expressed in terms of the previously computed constants.

After computation of TMOD and as illustrated in Step 464, this computed temperature is compared to the actual measured temperature TEMP(I) corresponding to a sample a distance Z above DE. As previously described in regard to FIG. 6, if the computed temperature is less than the measured temperature, the next approximation of A is derived by increasing the current value of A by the increment STEP. This is the case if the test shown in Step 464 answers NO. As illustrated, the process continues then through Branches 466 and 468 to Step 462 which has already been described.

If the computed temperature is greater than the measured temperature, the test shown in Step 464 answers YES and as previously discussed, the value of A used to compute this temperature is too high. The normal procedure in such cases is to decrease both the value of A and the increment used to increase subsequent approximations of A. However, there are practical limits in regard to how small this increment STEP may be allowed to become.

The test indicated in Step 470 consequently compares the current value of STEP to this practical limit, here shown as 0.01, for example. If this limit has not yet been reached, the test answers NO and the process continues to Step 472 where A is decreased to a value previously known to be too small. This may be done, for example, by subtracting the current value of STEP from the current value of A as shown in Step 472. Further, the current value of STEP is decreased to decrease the rate of incrementation of the value of A on subsequent approximations. This may be done, for example, as illustrated in Step 472, by dividing the current value of STEP by some number larger than one, i.e. 10.

The process then continues as indicated by Branch 468 in FIG. 4B to Step 462 with new values of A and STEP. The previously described process then continues until the practical limit of STEP has been reached as indicated when the test shown in Step 470 answers YES. At this point the process continues as shown by using Branch 474 to Step 476.

Step 476 represents the accumulation of each A value derived by the above process as performed for each sample within the interval between DE and DTOP. Thus for the first sample, the value of SUM is increased from its initial value 0 to the value of A corresponding to sample NM. For subsequent samples, the accumulated SUM corresponds to the sum of each value of A determined for NM measurements.

Next, as indicated in Step 478 of FIG. 4B, a test is made to see if the current depth DEPTH(I) equals the top of the measurement interval DTOP. If this is not the case as indicated by the test answering NO, the process returns by Branch 480 to Step 442. Here the measurement counter NM is incremented to represent a new sample and then subsequently tested as indicated in Step 444 to see if this sample corresponds to the first sample. If this is not the case, this test answers NO and the process continues as indicated by Branch 452 to Step 454 to determine a new initial value for both STEP and A for this subsequent sample.

As previously mentioned, one method of deriving subsequent initial estimates for A is by decreasing the approximation determined for the previous sample by an increment large enough to insure that the initial value A will generally be too small. Also the value of STEP may be increased at this time. As shown in Step 454 of FIG. 4B, the value of STEP may be, for example, increased to 10 times its previous value. The corresponding initial estimate of A may be then set to the previous value decreased by 2 times the above step value. This decrease is twice the value of STEP because in the subsequent Step 462, the value STEP will be again added to the initial value of A.

The process continues thereafter at Point C, as previously described with the initial sample until the test indicated in Step 478 determines that the current depth DEPTH(I) equals the top of the measurement interval DTOP. In such a case the test answers YES and the process continues to Step 490.

Step 490 represents the determination of a single value of A representative of all the temperature measurements between DE and DTOP which have been used in the process for determining the individual values of A now accumulated in the accumulator SUM. Since there are NM such values, one method of determining a single representative value may be as shown in Step 490. The illustrated method is to determine an average value as would be obtained by dividing SUM by NM. The process then continues to Point D which will be further described in regard to FIG. 4C. In this process the value of A determined as described above will be used in computing flow rates corresponding to the temperature measurements between DE and DTOP.

The method illustrated in FIG. 4B of comparing the computed temperature TMOD with a measured temperature TEMP(I) at each sample level may also be varied from that indicated in Step 464. For example, it is possible that TMOD will be substantially equal to TEMP(I), rather than exactly equal as indicated. In such a case there will be no need to make further approximations for the value A. Consequently, the test shown in Step 464 may indicate the temperatures are substantially equal and the process may continue, as indicated by Branches 465 and 474, to the previously described Steps 476 and 478 and then to Step 490. As shown in Step 490, a single value of A is then derived which is representative of all the measurements within the interval. As illustrated, the average value is computed by dividing SUM by NM, but other representative values could be used. For example, the mean value, or least square value, or even a weighted average value might be computed using the above approach by simple changes to the processes indicated in Steps 476 and 490.

Beginning then at Point D of FIG. 4C, Step 500 illustrates the solution of the previously described Equation 6 to determine the time dependent function $f(t)$, here designated as FT. The symbols LOGF and SQRTF correspond to the standard routines available in most computer programming systems for determining the natural logarithm and the square root functions, respectively, of the quantities enclosed in the brackets immediately following these symbols.

As previously described, the reference to time used in this equation is the total time in days that the borehole fluid has been flowing from depths DE to DTOP and causing a radial heat transfer. This value TIME was previously input as shown in Step 408 as was the value R, which is also used to compute FT by the equation illustrated in Step 500. The previously determined value is then combined with FT by dividing A by 9.47 FT to produce a mass flow rate QM. Note that this last relationship assumes that the specific heat of the fluid is near 1.0, the value of pure water.

When the density of the fluid RF is known, as is usually the case, a volumetric flow rate QV may be determined as indicated in the optional Step 502. Even when a number of intervals occur in the same well and the density of the fluid from each of the intervals is known only to be of the same unknown density, the mass flow rate may still be determined for each interval by the illustrated techniques and used to proportion the relative productivity of each interval.

When the density of the fluid at each entry point may vary, this density may be measured over each interval with a prior art density device 47, as illustrated in FIG. 1. This allows use of the determined mass flow rate with these density values for each interval to compute the corresponding volumetric flow rates.

After the computation of a flow rate, the depth DE, the value of A and the mass flow rate QM may be output as indicated in Step 506. Optionally, if the value of the fluid density RF is available to enable the computation of the volumetric flow rate QV, it may also be output. The output may be in numerical form at points on the recorded measurements corresponding to the processed intervals, such as represented at 62 and 64 in FIG. 1.

The remainder of the steps illustrated in FIG. 4C represent the computations of the temperatures over the interval using the previously adjusted model for heat transfer which includes the final value of A. This process begins as illustrated in Step 508, by resetting the sample number I to IE, the number previously stored as shown in Step 428 and which corresponds to depth DE. Since the value of A is now known and constant through a given interval, the constant GTA may be computed only once for the interval, as also shown in Step 508.

Next, Step 510 corresponds to the use of the previously mentioned procedure herein called ZPAR which will be described in detail in regard to FIG. 4D. As previously discussed, this procedure computes values needed to compute the temperature of the borehole fluid from the model using Equation 7. The computation of the TMOD, which corresponds to the temperature predicted by the model for heat transfer as adjusted with the final approximation of A, is shown next as Step 512. This temperature TMOD may then be output, as shown in Step 514, along with the corresponding depth DEPTH(I) and the actual measured temperature TEMP(I).

This output may take the form of a numerical listing or, as shown in FIG. 2, the computed and measured temperatures may be plotted on common depth and temperature scales, but distinguished in their curve representations. This type of output readily allows comparing the computed and measured temperatures resulting from the adjusted model and confirming that the computed flow rates correspond to the actual measured temperatures. Such output does not require special plotting apparatus or programming techniques.

The next Step 516 of FIG. 4C indicates a test for depth values equal to DTOP which corresponds to the top of the interval involved in the computation. The test will answer NO returning the process to Step 510 until all of the samples within the interval are considered. Thus for all samples between DE and DTOP, the value of TMOD is computed and output.

Finally, when DEPTH(I) equals DTOP, the test shown in Step 516 answers YES and the process now continues to the test indicated in Step 518. As indicated in this latter test, the interval counter N is tested against the number of intervals NI previously read as in Step 408 of FIG. 4A. If further intervals remain to be processed, as indicated by the test answering NO, the process returns by Branch 520 to Point E in FIG. 4A. The processes previously described are then performed for a new interval. If all the intervals have been processed, N equals NI and the test indicated in Step 518 answers YES, completing the process as shown by Step 522.

It is common in developing procedures used within digital computers to set aside that part of a procedure which may be used repeatedly throughout the main procedure. Such an often repeated procedure corresponds to the sub-procedure herein called ZPAR and illustrated in FIG. 4D. In such cases the main procedure calls the subprocedure, which is identified by its name. This is the case, for example, as shown in Steps 460 and 510 of FIGS. 4B and 4C, respectively. At the time of the call to the sub-procedure, control of the process is transferred to the subprocedure. This transfer of control is illustrated at STEP 530 in FIG. 4D as the entry to ZPAR.

At the completion of a sub-procedure, return to the main procedure takes place as illustrated by Step 534. The handling of such sub-procedures or sub-routines is well known in programming digital computers.

After entry into ZPAR, as shown by Step 530 in FIG. 4D, the process continues to Step 532. As indicated therein, the procedure calculates the distance Z corresponding to the difference between the depth DE and the current depth, herein indicated as DEPTH(I). The sample counter I may be advanced at this time to the next sample. A constant GTZ may be computed also at this time as the product of the geothermal gradient G and the distance Z. Also it is convenient to compute an additional constant TM1 corresponding to the first two terms of Equation 7. As will be readily recognized, the values of Z, GTZ and TM1 are constant for any given sample and are independent of the value of A.

It should be understood that it is not essential to separate such sub-procedures as ZPAR from the main procedure and that the equivalent result would be obtained by substituting the steps illustrated in FIG. 4D at each point in the process flow diagram where the step corresponding to calling ZPAR is found.

Turning now to FIG. 6, an alternate procedure for estimating the initial value of the relaxation distance A is illustrated. The procedure indicated between Points B and C of FIG. 6 may be substituted for the procedure between these corresponding points of FIG. 4B. Thus Step 540 may be used in place of Step 448, or for that matter, in place of Step 550 in FIG. 7.

The method illustrated in Step 540 of FIG. 6 first determines the temperature measured at the top of the interval, here designated TEMP(DTOP) and computes the difference between this temperature and the temperature expected at depth DTOP as if the heat transfer had already reached its equilibrium condition. This latter temperature is equal to (TFE - G (DE-DTOP)). The difference DIFF in these temperatures is illustrated in FIG. 2.

By examining FIG. 2, it is apparent that the temperature difference produced by fluid entry at or below DE is equal to G × A and corresponds to the temperature difference between gradients 92' and 95A. Note that gradient 92' passes through the temperature TFE of the fluid at DE. It can be seen from FIG. 2 that DIFF approaches G × A with increasing distance from the point DE. Thus as illustrated in FIG. 6, if this difference DIFF is divided by the gradient G, a minimum approximation of A may be obtained.

In addition, the initial value for STEP may be established as illustrated as a small part, here 1/10, for example, of the initial approximation of A. With this initial value, the procedure continues as previously discussed starting at Point C of FIG. 4B, previously described, or FIG. 7 which will now be described.

In brief review, the method illustrated in FIG. 7 differs from the method of FIG. 4B in that the computed and measured temperatures are compared over the interval without changing the value of A. This comparison results in a representative difference in temperatures over the interval. This difference is then used to determine, if required, further approximations of A.

Referring then to FIG. 7, there is illustrated an additional method of deriving a relaxation distance A representative of a portion or interval of temperature measurements. Beginning as illustrated at Point A shown in FIG. 4A, the method illustrated in FIG. 7 proceeds directly to a point corresponding to Point B of FIG. 4B, thus bypassing, for the time being, the steps associated with counting the number of measurements in the sample interval. The next step in the process, as illustrated in Step 550, establishes the initial values of STEP and the initial estimate of A. Here Step 550 corresponds to Step 448. As previously discussed, this step could also be performed as illustrated in FIG. 6, already described.

In any case, the procedure continues to Point C with initial value of STEP and A. Then as shown in Step 552, the sample counter I is set to the value IE, which corresponds to the sample number of point DE and the measurement counter MN and the accumulator SUM are now both set equal to 0. The initial estimate of A may be increased by the value STEP, as shown in Step 552, to provide the actual value of A to be used in the first computations. Also the constant GTA may be computed at this time as the product of A and the gradient G as shown in Step 552.

After this initial procedure the first measurement within the interval to be processed is established by a call to sub-procedure, ZPAR, as previously described and here indicated as STEP 554. This provides values needed to compute the temperature predicted from the model for heat transfer in the next step. As illustrated next in Step 556, the measurement counter NM is advanced to count this sample and the temperature TMOD is computed from the model using previously described Equation 7. Further, the difference between the compute TMOD and the actual measured temperature TEMP(I) is computed and added to the accumulator SUM.

The next step in the procedure is to test for the top of the interval as indicated in Step 558 of FIG. 7. If the top of the interval DTOP has not yet been reached, this test answers NO and the process returns as indicated by Branch 560 to repeat the above procedure, but now for a new sample. When the top of the interval is reached, as indicated by DEPTH(I) = DTOP, the test indicated in Step 558 answers YES and the average of the temperature differences DIFA is computed as indicated in Step 562. The absolute value of DIFA may also be computed as indicated by the function herein called ABSF which is standard in most computer languages. This function provides the value of DIFA independent of its algebraic sign. This absolute value may be conveniently compared to a previously given tolerance TOL. The value of TOL may be given by input for each interval, as for example, input along with the parameters shown in Step 408 of FIG. 4A.

As indicated in Step 564, if this comparison is satisfactory, the test answers YES and the procedures return to Point D of FIG. 4C, since the test indicates that the value of A used in the previous approximation produced computed temperatures which compared within a permitted tolerance to the actually measured temperatures. However, if this is not the case, the test indicated in Step 564 answers NO. Now the DIFA value may be compared to zero in order to obtain the direction in which to change the value A for the next approximation.

As previously explained, if the computed temperature is higher than the corresponding measured temperature, the value of A is already too high. This would be indicated by the test in Step 570 answering NO and the process would then proceed to Step 576 where the value of A is decreased to its previous value, which is known to be too low. In addition, the value of the rate of increase of the value A referred to herein as STEP is decreased, for example, to 1/10 its former value. The process then continues as indicated by Branch 578 to Point C and Step 552 where the decreased value of A determined as in Step 576 is now increased by the new value of STEP to obtain a new approximation. The previously described processes shown between Point C and Step 570 would then be repeated.

If the test indicated in Step 570 answers YES, indicating that the computed temperatures are still less than the measured temperatures, the process returns through Branchs 572 and 574 to Point C, as described above. The computation and comparison of DIFA is then repeated until the test indicated in Step 564 of FIG. 7 answers YES. The process then returns to Point C of FIG. 4C with the current value A to compute the flow rates.

The procedure illustrated by FIG. 7 corresponds to a method of using the same approximation of A for each of the samples within an interval and summing for each sample the difference between the resulting computed temperatures and the actual measured temperatures. The resulting sum or the average of this difference corresponds to a comparison of the computed and measured temperatures which result from a given approximation of A. This comparison may then be used in the same manner that the comparison between individual computed and measured temperatures were used, as illustrated in FIG. 4B.

Figure 8:
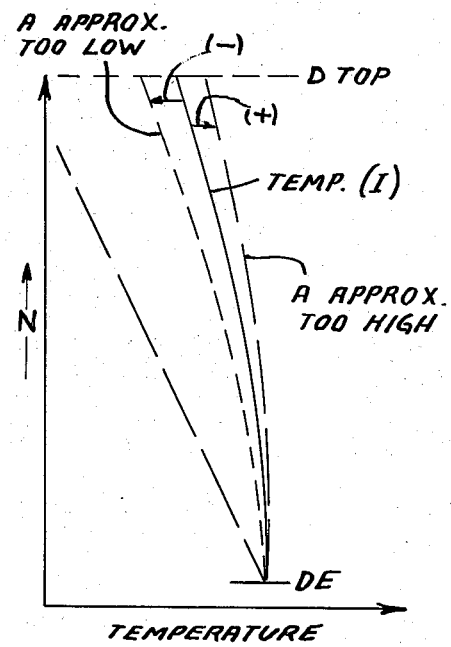
FIG. 8 indicates the effect of inaccurate approximations of the relaxation distance upon temperatures computed from the model for heat transfer as compared to the actual measured temperatures.

The relationship between the computed and measured temperatures over a given interval such as between DE and DTOP is illustrated in FIG. 8.

Referring now to FIG. 8, it may be seen that when the average difference between the computed and measured temperatures over the interval is negative, the A approximation is too low. Similarly, when the average difference is positive, the A approximation is too high. This relationship may be used accordingly to determine the next value for the A approximation.

FIG. 4B and FIG. 7 represent two different procedures for adjusting the heat transfer model to obtain a single value of the relaxation distance A which best represents at least a portion of the temperature measurements in a given interval. FIG. 4B illustrates the method where a value of A is first derived which represents the individual temperature measurements in the interval, thus one value of A is derived for each such measurement. These value of A are summed and a value of A representative of the interval is derived.

Regardless of whether the method illustrated in FIG. 4B of FIG. 7 is used to derive the representative value of A, or still another method is used, the procedure illustrated in FIG. 4C and previously described may be used for calculating the flow rates from this value.

Consider now the following illustrative example. A temperature log is recorded from 13,500 to 11,200 feet in a 5.5 inch diameter casing 62 days after oil production begins from an interval between 13,400 and 12,775 feet. The density of the oil is measured at the surface. Since no gas is produced, this density is easily converted using standard temperature and pressure charts to the conditions which exist at the production interval and is found to be equal to 0.73 grams/cc.

No previous temperature logs were made which would establish the actual geothermal gradient. Therefore, the production temperature log will be used to establish this gradient along with an assumption that this gradient is linear over the logging interval. No fluid is known to be flowing below 134,00 feet, therefore the temperature log below this point may be used to measure the gradient. The slope of the temperature log between 13,400 and 13,500 feet is found to be 0.016° F/ft. At 13,445 feet the temperature measurements appear to best represent this gradient.

Now considering the technique illustrated in FIG. 4A. The number of intervals NI is considered to be only 1 even though many perforations are known to be producing over the 625 foot production interval. This value of NI along with the recorded depths and temperature measurements are read as shown in Step 402. N is then incremented to 1 corresponding to the first and, in this case, only interval. I is set to zero to begin processing of the interval.

As shown in Step 408 of FIG. 4A, the following values are read: DE=12,700, DTOP=12,000 feet, G=0.016° F/ft. DG=13,445 feet, TIME=62 days, R=(5.5 inches/2)/12 inches/ft = 0.26 feet and RF=0.128 tons/barrel. Here density is converted from grams/cc to tons/barrel by multiplying by the weight of fresh water, i.e., 0.175 tons/barrel.

The face that DE is chosen well above the actual top of the production interval does not change the resulting flow rate determinations as long as a portion of the temperature measurements responding to this flow and reflecting the approach of the borehole temperature toward its asymptotic value is used. This fact, along with the fact that the asymptotic value need not be measured is one of the features of the present invention.

The process illustrated as Steps 410 through Point A of FIG. 4A subsequently finds that TDG = 225.2°, TFE= 219.5°F. Thus, a difference in temperatures DELT, equal to 219.5 − 213.1 or 6.4°, occurs between DG and DE.

Referring now to either of the processes illustrated in FIGS. 4B or 7, an approximation of a relaxation distance A is determined which results from the best comparison found between temperatures computed from an adjustable model and the actual measured temperatures over the interval between DE and DTOP. In this example A is determined to be 1599 feet.

Referring now to FIG. 4C, this value of A is used to compute the function of time FT as shown in Step 500. In this example FT equals $ln(0.26/2 \sqrt{0.96 \times 62}))$ or 3.90. The corresponding mass flow rate QM, using the equation shown in Step 500 (which assumes the specific heat of the oil is 1.0) is 1599/(9.47 × 3.90) or 43.2 short tons/days. Since the fluid density RF is known, the volumetric flow rate QV also may be computed as shown in Step 502 in FIG. 4C and is found to be 339 barrels of oil/day.

Figure 9:
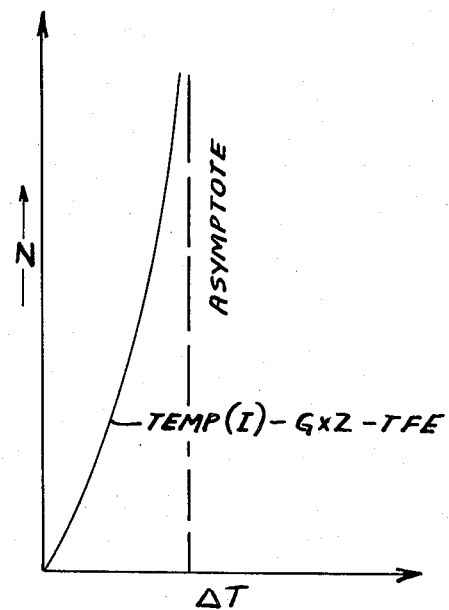
FIG. 9 illustrates temperature measurements which may be obtained by stripping the change in temperature due to the geothermal gradient and the temperature of the fluid at its entry point from the actual temperature measurements.

Referring now to FIG. 9, there is illustrated an alternate way of regarding the temperature measurements. Where it can be assumed that the geothermal temperature gradient G is constant over the interval of temperature measurements considered in the process, certain stable conditions may be removed from the actual temperature measurements before processing. This procedure may simplify the model for heat transfer by eliminating certain terms from the equations and thereby reducing the amount of computation required. For example, once the temperature of the fluid TFE entering at a given entry point is determined, this temperature may be subtracted from all of the measured temperatures within a given interval.

Still further, the geothermal gradient above the depth DE corresponding to TFE may also be removed from the measurements. The temperature curve resulting from the removal of TFE and the gradient G × Z is illustrated in FIG. 9. Increasing Z values are represented by the vertical axis as before. Increasing temperature differences are now represented on the horizontal axis. Note that the asymptote now appears as a vertical line parallel to the Z axis and displaced by a temperature difference ΔT from this axis.

In the above manner the terms of the equations used to represent the model for heat transfer which include the values TFE and GTZ (=GxZ) may be eliminated and the model thereby somewhat simplified. The comparison of the computed and measured temperatures may be modified to reflect these simplifications. Further, the temperature computed for display with the actual measured temperatures should then include provisions for adding values which were removed in the simplification process to the computed temperatures.

While the illustrated techniques of the present invention are described for the case of fluid entering a borehole from subsurface formations and flowing toward the surface, it is to be understood that the techniques of the invention are not limited to this application. For example, the illustrated techniques could be applied to fluid entering the borehole at one point and flowing downhole to exit the borehole at some distant point. The temperature measurements made between these points could be processed by the described techniques to determine corresponding flow rate. In this particular case, the flow rate could not be measured directly at the surface, as would be the case for fluids entering at a single point and flowing to the surface. Therefore, the flow rates determined by the techniques of the present invention would be of considerable value.

Still further, as previously mentioned, the techniques of the present invention could be applied to subsurface flow paths not necessarily associated with the production or injection of fluids through boreholes. For example, temperature measurements could be made along a flow path provided by an underground pipeline such as employed in the transfer of sewage, water, or in some cases, hydrocarbon products. In such cases, additional fluids may enter the flow path mixing with the fluid already flowing along the flow path.

In many cases, particularly where the pipeline corresponds to a sewer, the points of entry may correspond to known or unknown leaks or connections into the sewer. The techniques of the present invention may be applied in such cases by making the temperature measurements as the temperature measuring apparatus traverses the sewer and measures the corresponding temperature changes representative of the various entry points along this flow path.

Of course, in order to perform the determination of quantitative flow rates it will be recognized that the fluids in the flow path must be of a temperature substantially different than the heat conductive media surrounding the flow path. If this requirement does not occur naturally, heated or cooled fluids of known volume may be placed in the flow path upstream from possible entry points so that this fluid does not reach an equilibrium temperature with the heat conductive media surrounding the flow path before reaching the possible entry points. Thus, even if the fluids entering the flow path are entering at a temperature equal to the surrounding heat conductive media, they will mix with the fluids in the flow path which are at a different temperature and affect the rate at which subsequent heat transfer approaches an equilibrium state. This rate, of course, is reflected in the temperature measurements which can be used to determine the flow rate for such entry fluids by the techniques of the present invention.

In summary, there has been described the technique for automatically determining the flow rate, in particular the mass flow rate corresponding to fluids entering a flow path at one or more points along the flow path. The method utilizes the rate of radial heat transfer between the fluids and the heat conductive media surrounding the flow path. This heat transfer takes place whenever the temperature of the flowing fluid differs from that of the surrounding heat conductive media.

By utilizing changes in the measured temperature of the flowing fluid, the rate of change in heat transfer, as the heat transfer conditions approach an equilibrium state, may be determined. This rate of change may be expressed as a relaxation distance. Once this distance is determined, the mass flow rate may also be determined.

The relaxation distance is determined by fitting temperatures computed from an adjustable model for radial heat transfer corresponding to known measurement conditions to measured temperatures. This model may also include a non-linear relationship with the above described relaxation distance.

In the initial attempts to adjust the model, an estimate of the relaxation distance is used to compute temperatures from the model. The corresponding computed and measured temperatures may then be compared. Based upon the comparison of the computed and measured temperatures better approximations of the relaxation distance may be made. The computation, comparison and approximation process continues until a satisfactory comparison between the computed and measured temperatures is obtained. At this point the approximation of the relaxation distance is considered complete and the model properly adjusted.

The resulting relaxation distance is used along with other parameters and equations appropriate for the time duration of heat transfer, diameter of the flow path and thermal properties of the fluid and surrounding heat conductive media, to determine the mass flow rate corresponding to the measured temperatures. If the density of the fluid is known or can be determined, the mass flow rate may be converted into a volumetric flow rate.

While the particular embodiments of the present invention have been shown and described, it is apparent to those skilled in the art that various changes and modifications may be made therein without departing from the invention, and it is therefore intended to cover all such changes and modifications as fall within the true spirit and scope of the invention.

What is claimed is:

1. A method of automatically determining flow characteristics of fluids entering a substance flow path comprising:

produced measurements representative of the temperature of a fluid flowing in a subsurface flow path surrounded by a subsurface heat conductive media;

adjusting a given model for heat transfer between said subsurface heat conductive media and said flowing fluid to fit at least a portion of said measurements; and determining at least one flow rate characteristic of said fluid using said adjusted model.

2. The method of claim 1 wherein said flowing fluid is at a temperature different than the equilibrium temperature of said subsurface heat conductive media over at least a portion of said measurements causing a radial heat transfer between said media and said fluid.

3. The method of claim 2 wherein said determined flow rate characteristic of said fluid is the mass flow rate.

4. The method of claim 2 wherein said determined flow rate characteristic of said fluids is the volumetric flow rate.

5. The method of claim 3 wherein said portion of said measurements representative of temperature are made at a point where the difference in temperature between said flowing fluid and the equilibrium temperature of said subsurface heat conductive media has not reached an equilibrium condition.

6. The method of claim 5 wherein said equilibrium temperature of said subsurface heat conductive media is included in said model for heat transfer.

7. The method of claim 6 wherein said model for heat transfer includes a relaxation parameter from which a mass flow rate may be determined.

8. The method of claim 7 wherein said relaxation parameter has a non-linear relationship with at least a portion of said measurements.

9. The method of claim 8 wherein said non-linear relationship includes an exponential function.

10. The method of claim 9 wherein said step of adjusting said model for heat transfer includes the step of approximating said relaxation parameter and computing from said approximation and said model a temperature comparable to the temperature of said flowing fluid at a point corresponding to at least one of said measurements.

11. The method of claim 10 wherein said step of adjusting said model includes the step of comparing at least one of said measurements representative of the temperature of the flowing fluid with the temperature computed from said model using said approximation.

12. The method of claim 11 wherein said step of adjusting said model includes the step of improving said approximation based upon said comparison of said computed and measured temperatures.

13. The method of claim 12 wherein said step of improving said approximation includes adjusting successive approximations of said relaxation parameter included in said model to reduce differences between said computed and measured temperatures to a satisfactory level.

14. The method of claim 13 wherein the source for said fluid is a subsurface earth formation and said fluid is produced from said formation at temperatures substantially equal to said formation temperature and flows in the subsurface flow path over a portion thereof which is different in temperature than said produced fluid.

15. The method of claim 14 wherein said measurements representative of temperature are representative of temperature changes occurring in said flowing fluid at a multiplicity of points along the flow path.

16. The method of claim 15 wherein said measurements are made at substantially the same time and said time is known in reference to a time for beginning production of said fluid and included in said model for heat transfer.

17. The method of claim 16 wherein the step of adjusting said model by improving the approximation of said relaxation parameter to reduce differences between computed and measured temperatures includes repeating said step of adjusting for at least a portion of said measurements representative of temperature at more than one point along the flow path to derive approximated relaxation parameters for these points and combining said approximated parameters to determine a representative relaxation parameter for at least a portion of said measurements, said representative relaxation parameter being functionally related to the mass flow rate of the fluid flowing in the subsurface flow path at said points.

18. The method of claim 14 wherein said measurements representative of temperature are representative of temperature changes occurring at various times in said flowing fluid at the same point along the flow path of said fluid.

19. The method of claim 18 wherein said various times are known in reference to the time production began of said fluid.

20. A method of automatically determining the mass flow rate of a fluid produced in a subsurface well comprising:
producing measurements representative of the temperature of a fluid flowing in a borehole at points with a known relationship to at least one possible entry point for said fluid;
adjusting a given model for heat transfer between said flowing fluid and a subsurface heat conductive media surrounding said flowing fluid to substantially compare with at least a portion of said measurements; and
determining a characteristic representative of the flow rate of said fluid.

21. The method of claim 20 wherein said heat transfer is assumed to be in directions radial to the direction of fluid flow and induced by a known temperature difference between said fluid and said surrounding media.

22. The method of claim 21 wherein said temperature difference and induced heat transfer are not in an equilibrium condition.

23. The method of claim 22 wherein said model includes an unknown parameter which is a function of the flow rate.

24. The method of claim 23 wherein said parameter has a non-linear relationship with said measurements.

25. The method of claim 24 wherein said step of adjusting said model includes the step of approximating said unknown parameter.

26. The method of claim 25 wherein said step of approximating said unknown parameter includes the step of improving the approximation of said unknown parameter based upon a comparison of said measurements and corresponding temperatures computed from said model including said unknown parameter.

27. The method of claim 26 wherein said step of improving the approximation of said unknown parameter includes the step of increasing said approximation if said computed temperatures are too high and decreasing said approximation if said computed temperatures are too low when compared with the corresponding measurements.

28. The method of claim 27 wherein the step of determining a characteristic representative of the flow rate includes the step of determining the mass flow rate.

29. The method of claim 28 wherein said points with a known relationship to at least one possible entry point for said fluid correspond to depths of a known distance along the flow path of said fluid from said entry point.

30. The method claim 29 wherein said measurements are made at substantially the same time.

31. The method of claim 28 wherein said points with a known relationship to a least one possible entry point for said fluid correspond to times of a known duration from the start of entry of said fluid from said entry point.

32. A method of automatically determining the flow rate of fluid produced from subsurface formations and flowing through a borehole surrounded by heat conductive media comprising:
producing measurements representative of the temperature of the fluid as it flows through a portion of the borehole and experiences a non-linear rate of radial heat transfer with the surrounding heat conductive media;
computing temperatures corresponding to the measurements from a given model for the radial heat transfer using an approximation of an unknown value of a parameter in the model which is a function of the mass flow rate of the flowing fluid;
comparing the computed temperatures and corresponding measurements and adjusting the approximation to obtain a satisfactory comparison; and
determining the flow rate of the flowing fluid from the adjusted approximation value of the parameter in the model.

33. The method of claim 32 and further including the step of outputing said computed temperatures in a manner which allows comparison with said corresponding measurements.

34. An apparatus for automatically determining flow rates of fluids produced from subsurface formations and flowing through a borehole surrounded by heat conductive media, comprising:
a borehole fluid temperature measuring means for producing measurements representative of the temperature of the fluid as it flows through a portion of the borehole and experiences a non-linear rate of radial heat transfer with the surrounding heat conductive media;
means for computing temperatures corresponding to the measurements produced by the temperature measuring means, said computing means including means for providing a model for the radial heat transfer dependent upon a value of a parameter related to the flow rate of the fluid experiencing the heat transfer;
means for approximating a parameter coupled to the computing means and operative to minimize differences between the produced and computed temperatures; and
means coupled to the parameter approximating means for determining the flow rate of the fluid represented by the temperature measurements.

35. The apparatus of claim 34 and further including an output means coupled with the computing means and the measuring means to provide output of the temperatures respectively computed and produced from these means in a common presentation for visual comparison.

36. A method of automatically determining with a machine the flow rate of a fluid produced from a subsurface formation and flowing through a subsurface flow path surrounded by heat conductive media comprising:
producing measurements representative of the temperature of the flowing fluid at a plurality of points along a portion of the flow path undergoing a non-linear rate of radial heat transfer with the surrounding heat conductive media;
computing temperatures from a given model for the radial heat transfer using an approximation of an unknown value of a parameter which is a function of the mass flow rate of the flowing fluid, said computed temperatures corresponding to at least a segment of the measured temperatures;
comparing said computed temperatures and corresponding measurements and adjusting according to said comparison the approximation of the unknown value to obtain a satisfactory comparison; and
determining the flow rate of the flowing fluid from the adjusted approximation of the unknown value of the parameter.

37. The method of claim 36 and further including the step of displaying said computed temperatures in a manner which allows further comparison with said corresponding measurements to allow confirmation that the model represents the measurements.

38. A method of automatically determining with a machine the flow rate of a fluid produced from a subsurface formation and flowing through a subsurface borehole surrounded by heat conductive media comprising:
producing measurements representative of the temperature of the flowing fluid at a plurality of points along a portion of the borehole undergoing a non-linear rate of radial heat transfer with the surrounding heat conductive media;
computing temperatures from a given model for the radial heat transfer using an approximation of an unknown parameter which is a function of the mass flow rate of the flowing fluid, said computed temperatures corresponding to at least a portion of the measured temperatures;
comparing said computed temperatures and corresponding measurements and adjusting according to said comparison the approximation of the unknown parameter to obtain a satisfactory comparison; and
determining the flow rate of the flowing fluid from the adjusted approximation of the parameter.

39. The method of claim 38 and further including the step of displaying said computed temperatures in a manner which allows further comparison with said corresponding measurements to allow confirmation that the model represents the measurements.

40. An apparatus for automatically determining the flow rate of a fluid produced from subsurface formations and flowing through a flow path surrounded by heat conductive media comprising:
means for obtaining measurements representative of the temperature of the flowing fluid at a plurality of points along a portion of the flow path undergoing a non-linear rate of radial heat transfer with the surrounding heat conductive media;
means for computing temperatures from a given model for radial heat transfer and comparing said computed temperatures with corresponding measured temperatures; said model including an approximation of an unknown value of a parameter related to the mass flow rate of the flowing fluid; said computed temperatures corresponding to at least a portion of the measured temperatures; said comparing including adjusting said approximation according to the relationship between said computed and measured temperatures until they are in substantial agreement; and means for determining the flow rate of the flowing fluid from the adjusted approximation of the value of the parameter related to the mass flow rate.

41. The apparatus of claim 40 and further including means for displaying the measured temperatures and said computed temperatures corresponding to the adjusted approximation in a manner that allows visual comparison for confirmation that the adjusted approximation included in the model represents the measured temperatures.

* * * * *

UNITED STATES PATENT OFFICE
CERTIFICATE OF CORRECTION

Patent No. 3,913,398　　　　　　　　Dated October 21, 1975

Inventor(s)　　　　　M. Rex Curtis

It is certified that error appears in the above-identified patent and that said Letters Patent are hereby corrected as shown below:

Column 1, line 43, for "along with" read -- logs --. Column 5, line 53, for "at al" read -- et al --. Column 7, line 21, for "$\pi_f$" read -- $\rho_f$ --. Column 10, line 28, for "foramtion" read -- formation --. Column 11, line 50, after "G" delete the hyphen " - "; line 51, for "-BG" read -- DG --. Column 12, after "G" at end of line 61, delete the hyphen " - ". Column 16, line 55, for "14A" read -- 4A --. Column 19, line 2, for "circle" read -- circles --. Column 20, line 24, for "in" read -- at --; line 27, after "along" insert -- with --; line 35, after "(" remove the hyphen " - ". Column 26, line 14, for "compute" read -- computed --. column 27, line 55, for "134,00" read -- 13,400 --. Column 28, line 10, for "face" read -- fact --; line 37, for "days" read -- day --.

In Claim 1, Column 30, line 49, for "substance" read -- subsurface --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*